(12) United States Patent
Yamazaki et al.

(10) Patent No.: US 12,008,256 B2
(45) Date of Patent: *Jun. 11, 2024

(54) MEMORY SYSTEM WITH ACCESSIBLE STORAGE REGION TO GATEWAY

(71) Applicant: KIOXIA CORPORATION, Tokyo (JP)

(72) Inventors: Atsushi Yamazaki, Tokyo (JP); Kentaro Umesawa, Kawasaki Kanagawa (JP); Naoko Yamada, Yokohama Kanagawa (JP); Yuta Kageyama, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,427

(22) Filed: Oct. 4, 2022

(65) Prior Publication Data
US 2023/0033947 A1 Feb. 2, 2023

Related U.S. Application Data

(63) Continuation of application No. 16/526,591, filed on Jul. 30, 2019, now Pat. No. 11,494,104.

(30) Foreign Application Priority Data

Mar. 19, 2019 (JP) .................................. 2019-051116

(51) Int. Cl.
*G06F 11/00* (2006.01)
*G06F 3/06* (2006.01)
*G06F 11/26* (2006.01)

(52) U.S. Cl.
CPC .......... *G06F 3/0647* (2013.01); *G06F 3/0604* (2013.01); *G06F 3/0673* (2013.01); *G06F 11/26* (2013.01)

(58) Field of Classification Search
None
See application file for complete search history.

(56) References Cited

U.S. PATENT DOCUMENTS

2012/0185841 A1 7/2012 Lee et al.
2017/0078400 A1 3/2017 Binder et al.
(Continued)

FOREIGN PATENT DOCUMENTS

CN 102681915 A 9/2012
CN 109117313 A 1/2019
(Continued)

OTHER PUBLICATIONS

Google Scholar/Patents search—text refined (Year: 2023).*
Google Scholar/Patents search—text refined (Year: 2024).*
Google Scholar/Patents—text refined (Year: 2022).

*Primary Examiner* — Christopher S McCarthy
(74) *Attorney, Agent, or Firm* — Foley & Lardner LLP

(57) ABSTRACT

A memory system comprising a first storage region which stores first firmware corresponding to an external first electronic control apparatus; a second storage region which stores second firmware corresponding to an external gateway and third firmware corresponding to the first electronic control apparatus; and a controller configured to transmit the second firmware and the third firmware to the gateway on the basis of a first command received from the gateway, and transmit the first firmware to the gateway on the basis of a second command received from the gateway.

20 Claims, 16 Drawing Sheets

(56) References Cited

U.S. PATENT DOCUMENTS

| | | |
|---|---|---|
| 2018/0074929 A1 | 3/2018 | Kito et al. |
| 2018/0093623 A1 | 4/2018 | Terwilliger et al. |
| 2019/0394277 A1 | 12/2019 | Go et al. |
| 2020/0344116 A1 | 10/2020 | Maeda et al. |
| 2020/0361412 A1 | 11/2020 | Ogawa et al. |

FOREIGN PATENT DOCUMENTS

| | | |
|---|---|---|
| EP | 2 991 275 A1 | 3/2016 |
| JP | 2018-026791 A | 2/2018 |

* cited by examiner

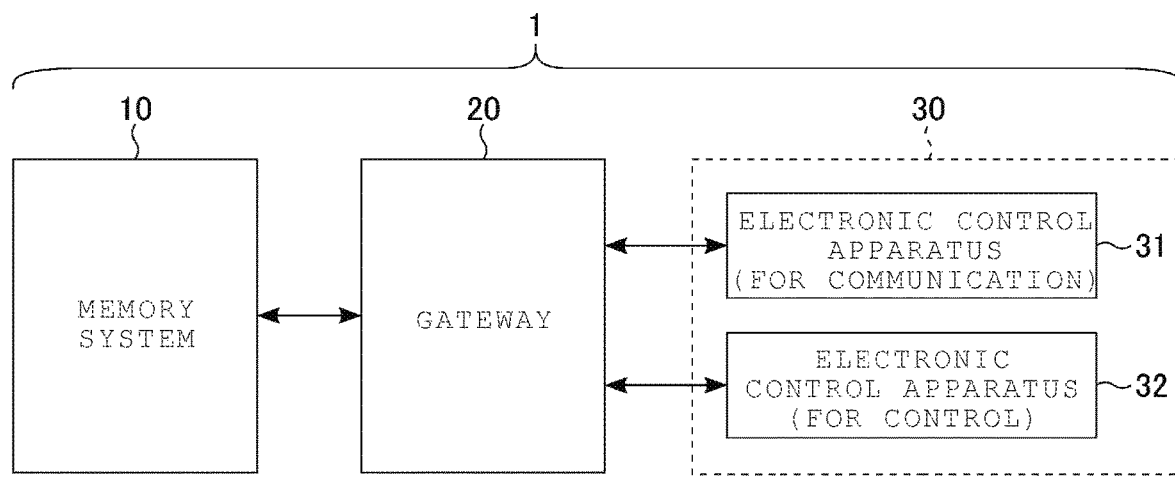
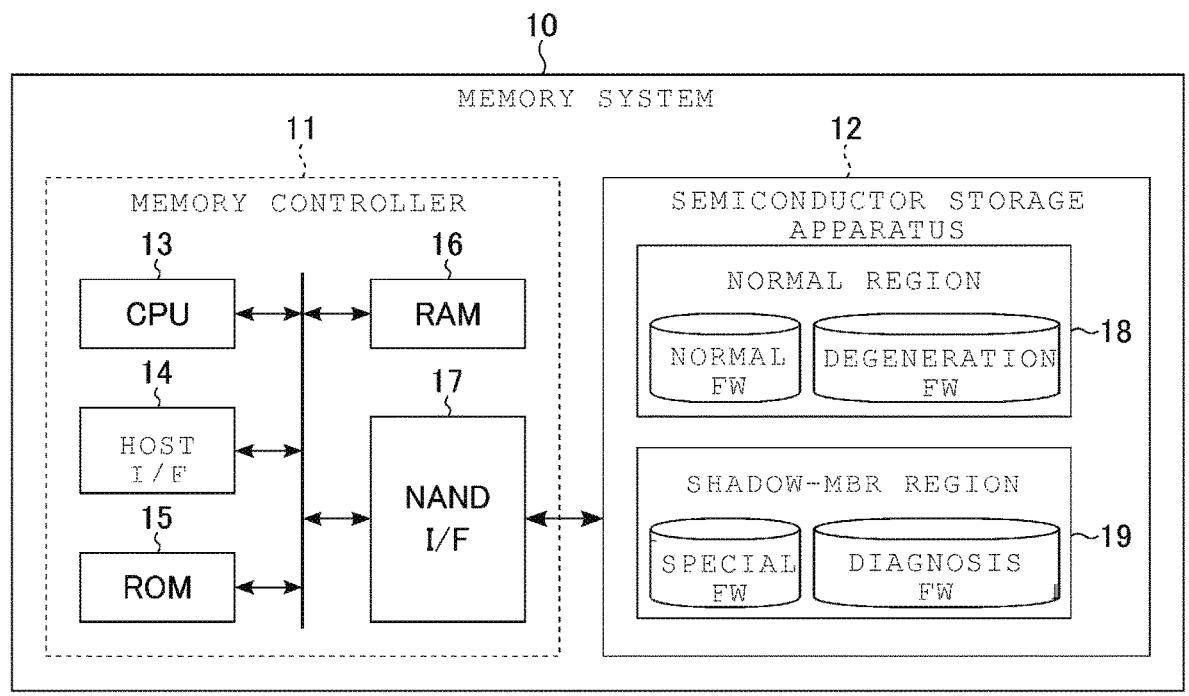

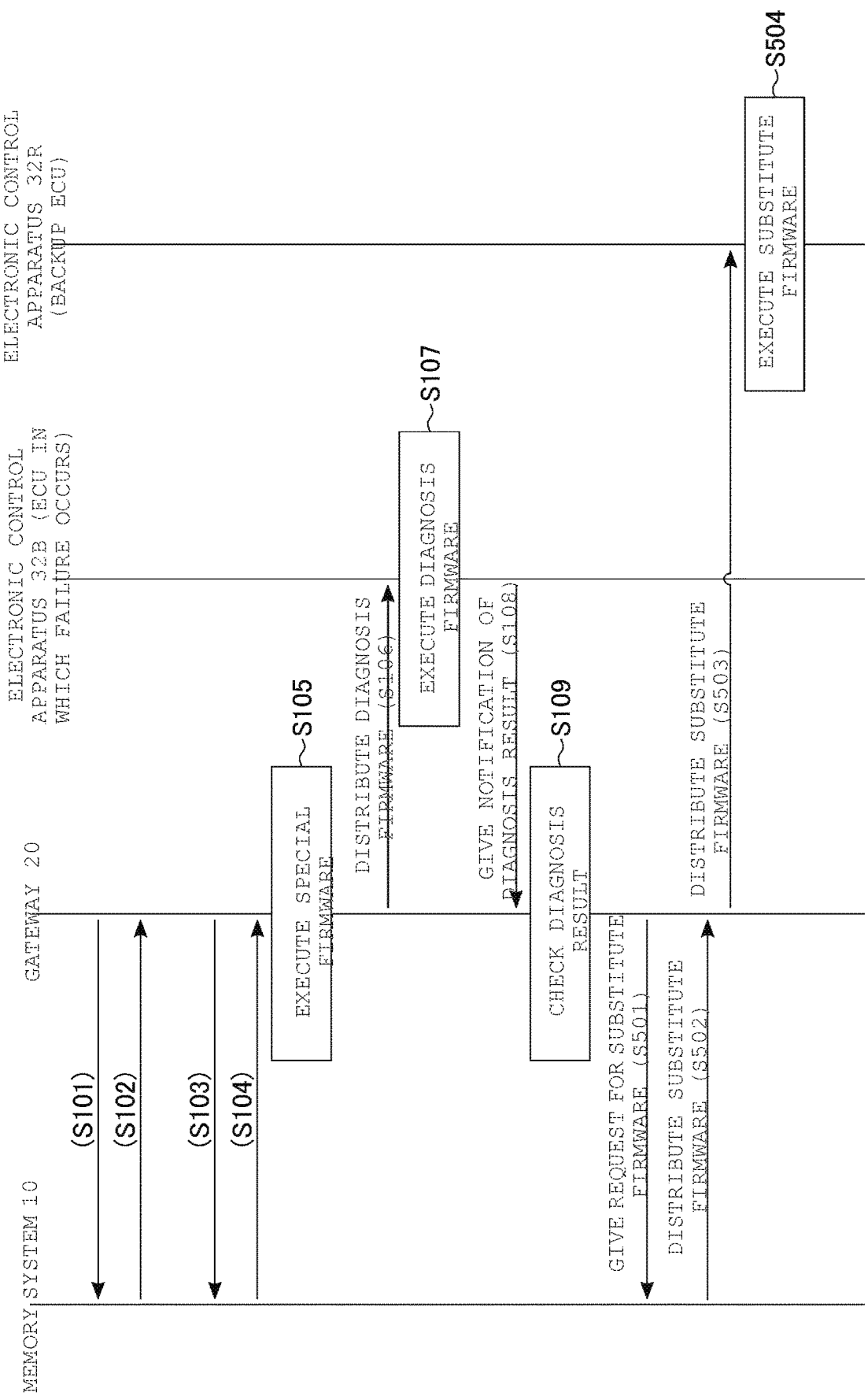

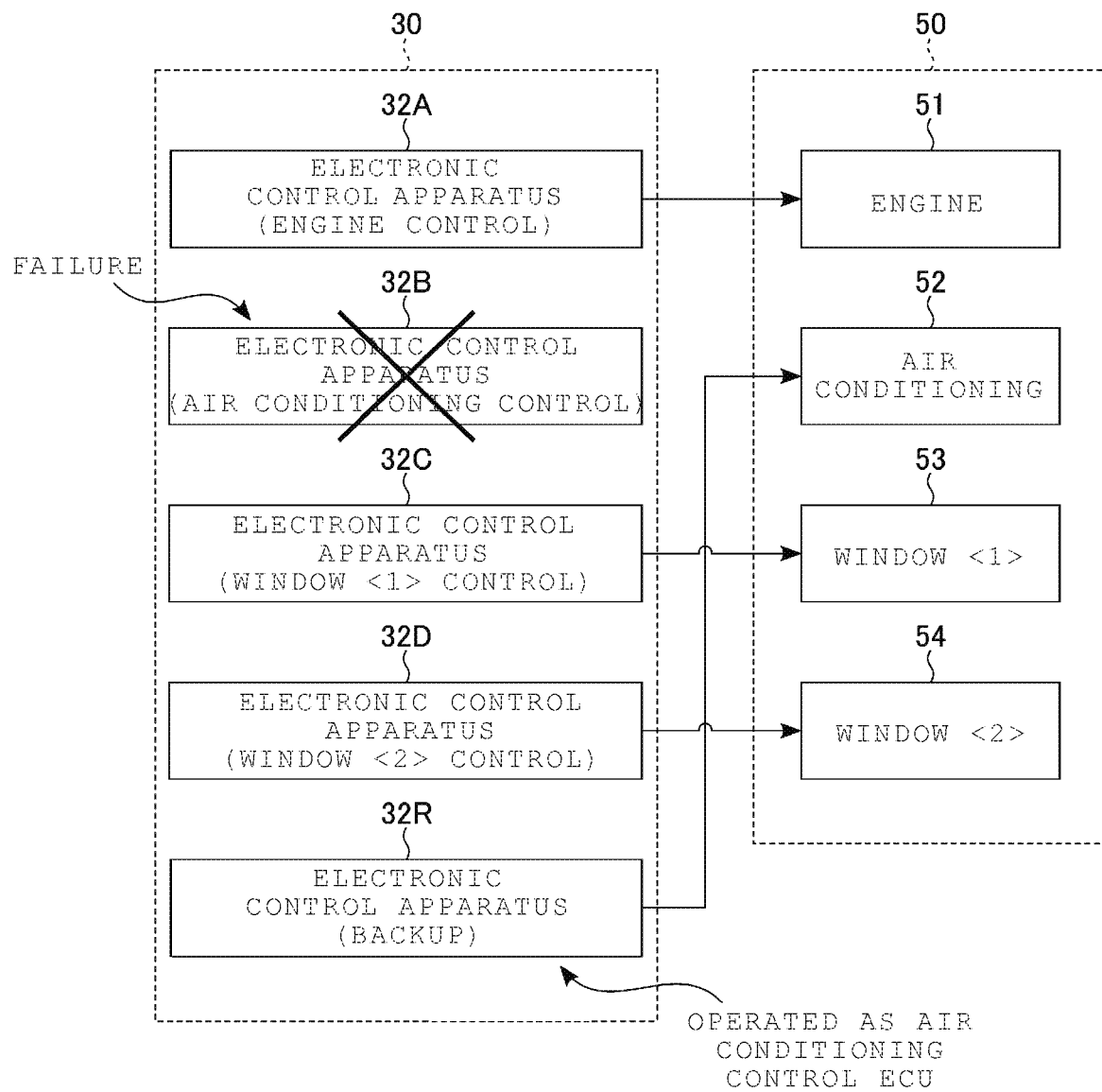

MEMORY SYSTEM WITH ACCESSIBLE STORAGE REGION TO GATEWAY

CROSS-REFERENCE TO RELATED APPLICATIONS

This application is a continuation of U.S. patent application Ser. No. 16/526,591, filed Jul. 30, 2019, which is based on and claims the benefit of and priority to Japanese Patent Application No. 2019-051116, filed Mar. 19, 2019, the entire contents of which are incorporated herein by reference.

FIELD

Embodiments described herein relate generally to a memory system and a control system.

BACKGROUND

Certain NAND flash memories are capable of storing data in a non-volatile manner.

DESCRIPTION OF THE DRAWINGS

FIG. 1 is a block diagram of a control system according to a first embodiment;
FIG. 2 is a block diagram of a memory system in the control system according to the first embodiment;
FIG. 16 is a flowchart of a restoration operation in the control system according to the fifth embodiment;
and
FIG. 17 is a block diagram illustrating an example of an operation state in the control system according to the fifth embodiment.

DETAILED DESCRIPTION

Figure 3:
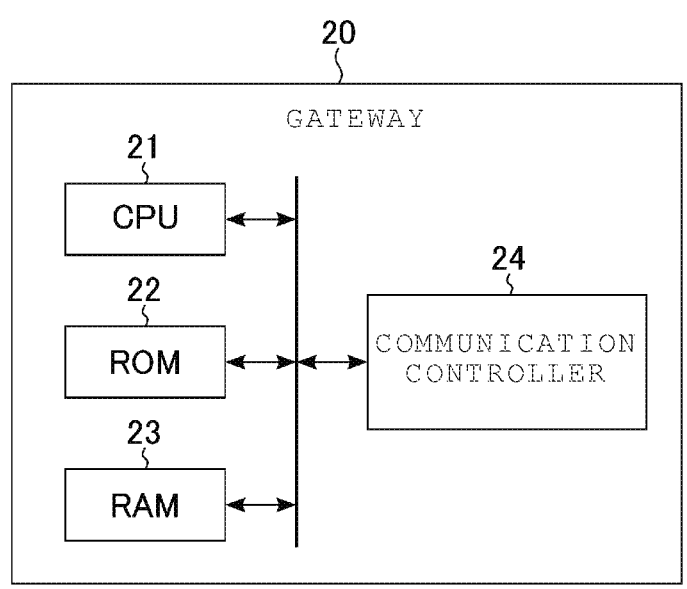
FIG. 3 is a block diagram of a gateway in the control system according to the first embodiment.

Embodiments described herein provide for a memory system and a control system which are capable of improving safety.

In general, according to one embodiment, a memory system comprising a first storage region which stores first firmware corresponding to an external first electronic control apparatus; a second storage region which stores second firmware corresponding to an external gateway and third firmware corresponding to the first electronic control apparatus; and a controller, wherein the first storage region is configured to be accessible to the gateway when the gateway is started using a first software, and accessible to the gateway when the gateway is started using a second software, the second storage region is configured to be inaccessible to the gateway when the gateway is started using the first software, and accessible to the gateway when the gateway is started using the second software, and the controller is configured to transmit the second firmware and the third firmware to the gateway on the basis of a first command received from the gateway, and transmit the first firmware to the gateway on the basis of a second command received from the gateway.

Hereinafter, embodiments of the present disclosure will be described with reference to the accompanying drawings. The embodiments exemplify apparatuses and methods for embodying technical aspects of the present disclosure. The drawings are schematic or conceptual drawings. The term "connection" as used in this specification indicates electrical connection and does not exclude a case where another element or equipment is interposed between components. In the following description, components having substantially the same function and configuration will be denoted by the same reference sign. A character after a numeral constituting a reference sign is referred to by a reference sign including the same numeral and is used to distinguish between components having the same configuration. When components denoted by reference signs including the same numeral are not required to be distinguished from each other, these components are respectively referred to by reference signs including only numerals.

[1] First Embodiment

Hereinafter, a control system 1 according to a first embodiment will be described.

[1-1] Configuration

Overall Configuration of Control System 1

FIG. 1 illustrates a configuration example of a control system 1 according to the first embodiment. The control system 1 is used as, for example, an in-car engine control system. The control system 1 includes, for example, a memory system 10, a gateway 20, and an electronic control unit (ECU) set 30 that includes one or more electronic control apparatuses.

The memory system 10 is, for example, a solid state drive (SSD). The memory system 10 can store data in a non-volatile manner. The memory system 10 is connected to the gateway 20 and is operated, for example, under the control of the gateway 20. The memory system 10 stores, for example, firmware of the gateway 20, firmware of an electronic control apparatus of an ECU, an operation log of the control system 1, and the like.

The gateway 20 is a network equipment enabling apparatuses in the control system 1 to transmit and receive information to and from each other. The gateway 20 controls the operation of the control system 1. The gateway 20 is connected to each of the electronic control apparatuses in the ECU set 30 and relays, for example, transmission and reception of information (data) between the electronic control apparatuses. In addition, the gateway 20 may have a function of storing information about operations of the electronic control apparatuses connected to the gateway 20 and data relayed between the electronic control apparatuses in the memory system 10 as logs. Further, the gateway 20 may be operated as a central processing unit of the control system 1.

The ECU set 30 includes, for example, electronic control apparatuses 31 and 32. Each of the electronic control apparatuses 31 and 32 controls equipment associated with the electronic control apparatus on the basis of a control value stored in advance in firmware (e.g. software). The electronic control apparatus 31 is, for example, a microcontroller for communication which is used for communication with an external network. The electronic control apparatus 32 is, for example, a microcontroller for control which controls an electrical auxiliary apparatus when operation control of an engine is performed using the auxiliary apparatus. The electronic control apparatuses in the ECU set 30 may share information through the gateway 20.

In addition, the above-described configuration of the control system 1 is merely an example and is not limited thereto. For example, the memory system 10 may be embedded into the gateway 20. The number of electronic control apparatuses in the ECU set 30 may be designed to any appropriate number. Methods of communication between the gateway 20 and the electronic control apparatuses may be the same as or different from each other. An object to be controlled by the electronic control apparatus is not limited to the engine, and any appropriate equipment may be controlled depending on firmware to be executed.

Next, detailed configurations of the memory system 10, the gateway 20, and the ECU set 30 in the control system 1 according to the first embodiment will be described in order.

Configuration of Memory System 10

FIG. 2 illustrates a configuration example of the memory system 10 in the control system 1 according to the first embodiment. The memory system 10 includes a memory controller 11 and a semiconductor storage apparatus 12.

First, the memory controller 11 will be described. The memory controller 11 is, for example, an SSD controller. The memory controller 11 controls the semiconductor storage apparatus 12. The memory controller 11 includes a central processing unit (CPU) 13, a host interface circuit (host I/F) 14, a read only memory (ROM) 15, a random access memory (RAM) 16, and a NAND interface circuit (NAND I/F) 17.

The CPU 13 is an arithmetic processing apparatus that controls the operation of the memory controller 11. For example, the CPU 13 commands the semiconductor storage apparatus 12 to execute a read-out operation on the basis of an instruction of the external gateway 20. In addition, the CPU 13 executes various processes for managing a memory space of the semiconductor storage apparatus 12 such as wear-leveling.

The host interface circuit 14 is a hardware interface which is connected to the external gateway 20 and controls communication between the memory system 10 and the gateway 20. For example, the host interface circuit 14 supports communication interface standards such as a serial advanced technology attachment (SATA), serial attached SCSI (SAS), and PCI express (PCIe) (registered trademark).

The ROM 15 is a read-only storage apparatus that stores data in a non-volatile manner. The ROM 15 stores, for example, control programs, control data, and the like of the memory controller 11. For example, the ROM 15 stores a basic input/output system (BIOS).

The RAM 16 is a storage apparatus which is used as a work area of the CPU 13. The RAM 16 stores, for example, a table for managing a storage region of the semiconductor storage apparatus 12, and the like. As the RAM 16, for example, a volatile memory such as a dynamic random access memory (DRAM) or a static random access memory (SRAM) is used.

The NAND interface circuit 17 is a hardware interface that controls transmission of data, commands, and addresses between the memory controller 11 and the semiconductor storage apparatus 12. The NAND interface circuit 17 supports a NAND interface standard.

Next, the semiconductor storage apparatus 12 will be described. The semiconductor storage apparatus 12 is, for example, a NAND flash memory. A storage region of the semiconductor storage apparatus 12 includes, for example, a normal region 18 and a Shadow-MBR region 19.

The normal region 18 is a region which is accessible by the gateway 20 during a normal operation of the control system 1. When the control system 1 is started using normal master boot record (MBR) software, the control system transitions to a normal operation. The MBR software is data which is read out from the memory system 10 when the control system 1 is started and includes information on the start of the control system 1. The normal MBR software is MBR software selected during the normal operation of the control system 1 and is stored in, for example, the normal region 18. In addition, for example, normal firmware (normal FW) and degeneration firmware (degeneration FW) are stored in the normal region 18.

Each of the normal firmware and the degeneration firmware is firmware of the electronic control apparatus in the ECU set 30. An electronic control apparatus executing the normal firmware is operated in a normal mode. An electronic control apparatus executing the degeneration firmware is operated in a degeneration mode. The electronic control apparatus in the degeneration mode performs more limited control than in the normal mode.

The Shadow-MBR region 19 is a region in which access by the gateway 20 is restricted. Access to the Shadow-MBR region 19 by the gateway 20 is permitted when the control system 1 is started using Shadow-MBR software. The Shadow-MBR software is MBR software for accessing a storage region (for example, the Shadow-MBR region 19) for which authentication is required in the memory system 10. That is, the Shadow-MBR region 19 is set to be inaccessible by the gateway 20 started during a normal operation of the control system 1, that is, with the normal MBR software. For example, special firmware (special FW) and diagnosis firmware (diagnosis FW) are stored in the Shadow-MBR region 19.

The special firmware is firmware of the gateway 20. The gateway 20 executing the special firmware is operated in a restoration mode. The restoration mode of the gateway 20 is used in a restoration operation of the control system 1 to be described later. The diagnosis firmware is firmware of the electronic control apparatus in the ECU set 30. The electronic control apparatus executing the diagnosis firmware executes a self-diagnosis operation of specifying a part where an abnormality occurs in the electronic control apparatus.

In addition, the above-described configuration of the memory system 10 is merely an example and is not limited thereto. For example, the number of semiconductor storage apparatuses 12 in the memory system 10 is not limited to one and may be designed to any appropriate number. When the memory system 10 includes a plurality of semiconductor storage apparatuses 12, the plurality of semiconductor storage apparatuses 12 are connected to the NAND interface circuit 17, and the memory controller 11 controls the plurality of semiconductor storage apparatuses 12 independently. Each of the normal firmware and the degeneration firmware may be provided for each equipment to be controlled. The diagnosis firmware may be provided for each electronic control apparatus, or common firmware may be used between electronic control apparatuses.

Configuration of Gateway 20

FIG. 3 illustrates a configuration example of the gateway 20 in the control system 1 according to the first embodiment. The gateway 20 includes a CPU 21, a ROM 22, a RAM 23, and a communication controller 24.

The CPU 21, the ROM 22, and the RAM 23 are configured in the same manner as, for example, the CPU 13, the ROM 15, and the RAM 16 in the memory system 10. The CPU 21 controls the operation of the gateway 20. The ROM 22 stores control programs, control data, and the like of the gateway 20. The RAM 23 is used as a work area of the CPU 21.

The communication controller 24 is connected to the memory system 10 and each of the electronic control apparatuses in the ECU set 30. The communication controller 24 controls communication between the gateway 20 and the memory system 10 and communication between the gateway 20 and each of the electronic control apparatuses in the ECU set 30.

Configuration of ECU Set 30

Figure 4:
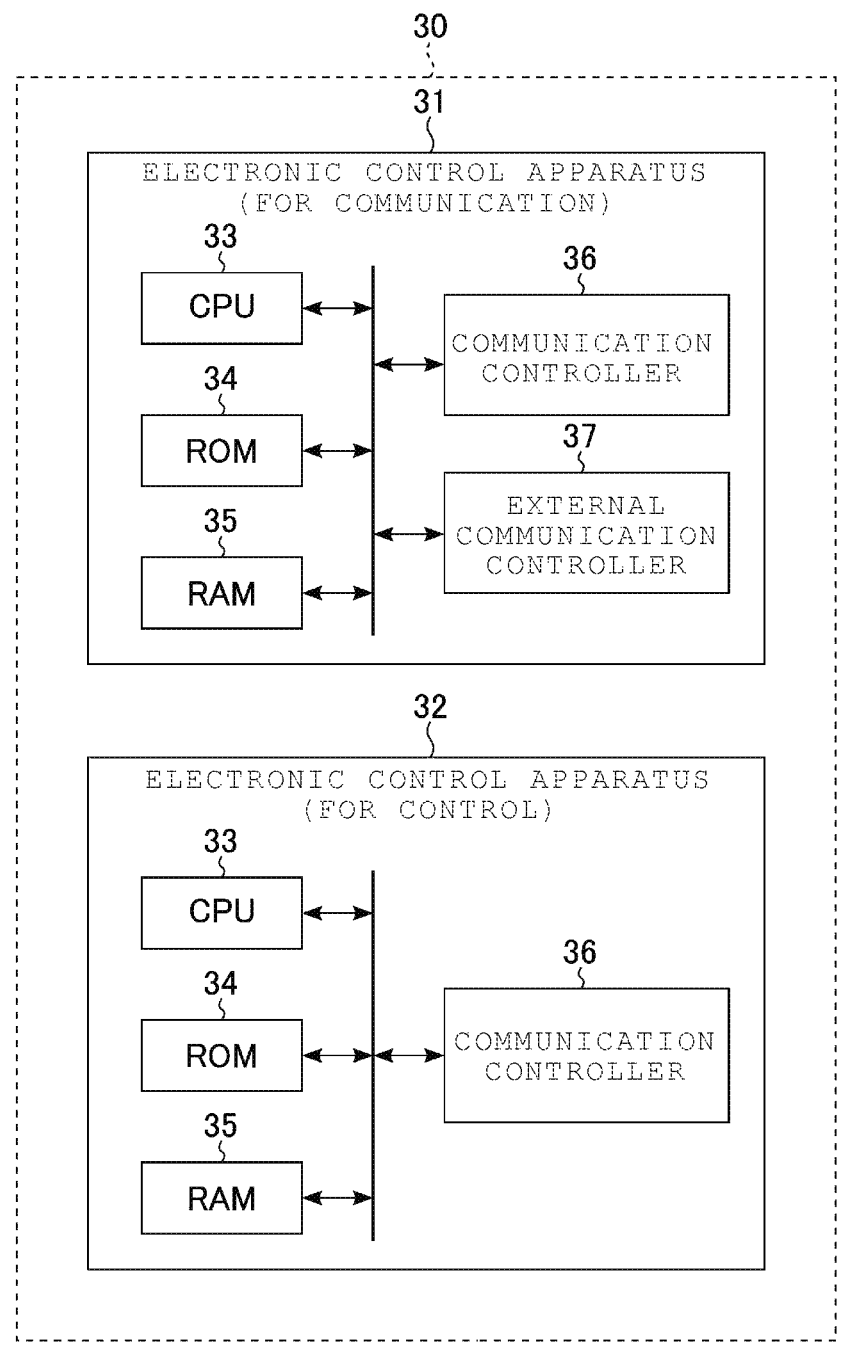
FIG. 4 is a block diagram of an electronic control apparatus in the control system according to the first embodiment.

FIG. 4 illustrates a configuration example of the ECU set 30 in the control system 1 according to the first embodiment. The electronic control apparatus 31 in the ECU set 30 includes a CPU 33, a ROM 34, a RAM 35, a communication controller 36, and an external communication controller 37.

The CPU 33, the ROM 34, the RAM 35, and the communication controller 36 are configured in the same manner as, for example, the CPU 21, the ROM 22, the RAM 23, and the communication controller 24 in the gateway 20. The CPU 33 controls the operation of the electronic control apparatus. The ROM 34 stores control programs, control data, and the like of the electronic control apparatus. The RAM 35 is used as a work area of the CPU 33. The communication controller 36 controls communication between the electronic control apparatus and the gateway 20.

The external communication controller 37 is configured so as to be accessible to equipment outside the control system 1 or an external network. The external communication controller 37 controls communication between the control system 1 and the external equipment. Any appropriate method may be used as a method of communication between the control system 1 and the external equipment. For example, wireless communication or wired communication may be used for communication between the control system 1 and the outside.

In addition, the configuration of the electronic control apparatus 32 is the same as or similar to a configuration of the electronic control apparatus 31, except that the external communication controller 37 is omitted, and thus redundant description thereof will be omitted. Configurations of the respective electronic control apparatuses in the ECU set 30 may be the same as or different from each other. The electronic control apparatus 32 for control may include the external communication controller 37 in some embodiments.

[1-2] Operations

The control system 1 according to the first embodiment can execute an alteration detection operation and a restoration operation. The alteration detection operation is an operation of inspecting whether or not the electronic control apparatus in the ECU set 30 is altered, for example, whether or not an abnormality occurs in the electronic control apparatus. The restoration operation is an operation of restoring the altered electronic control apparatus to a normal state. The restoration operation is executed when it is detected that the electronic control apparatus is altered from results of the alteration detection operation.

Hereinafter, details of an alteration detection operation and a restoration operation in the control system 1 according to the first embodiment will be described in order. Further, in the description of operations in the control system 1 according to the first embodiment, a case where an alteration detection operation and a restoration operation for the electronic control apparatus 31 in the ECU set 30 are executed will be described.

Figure 5:
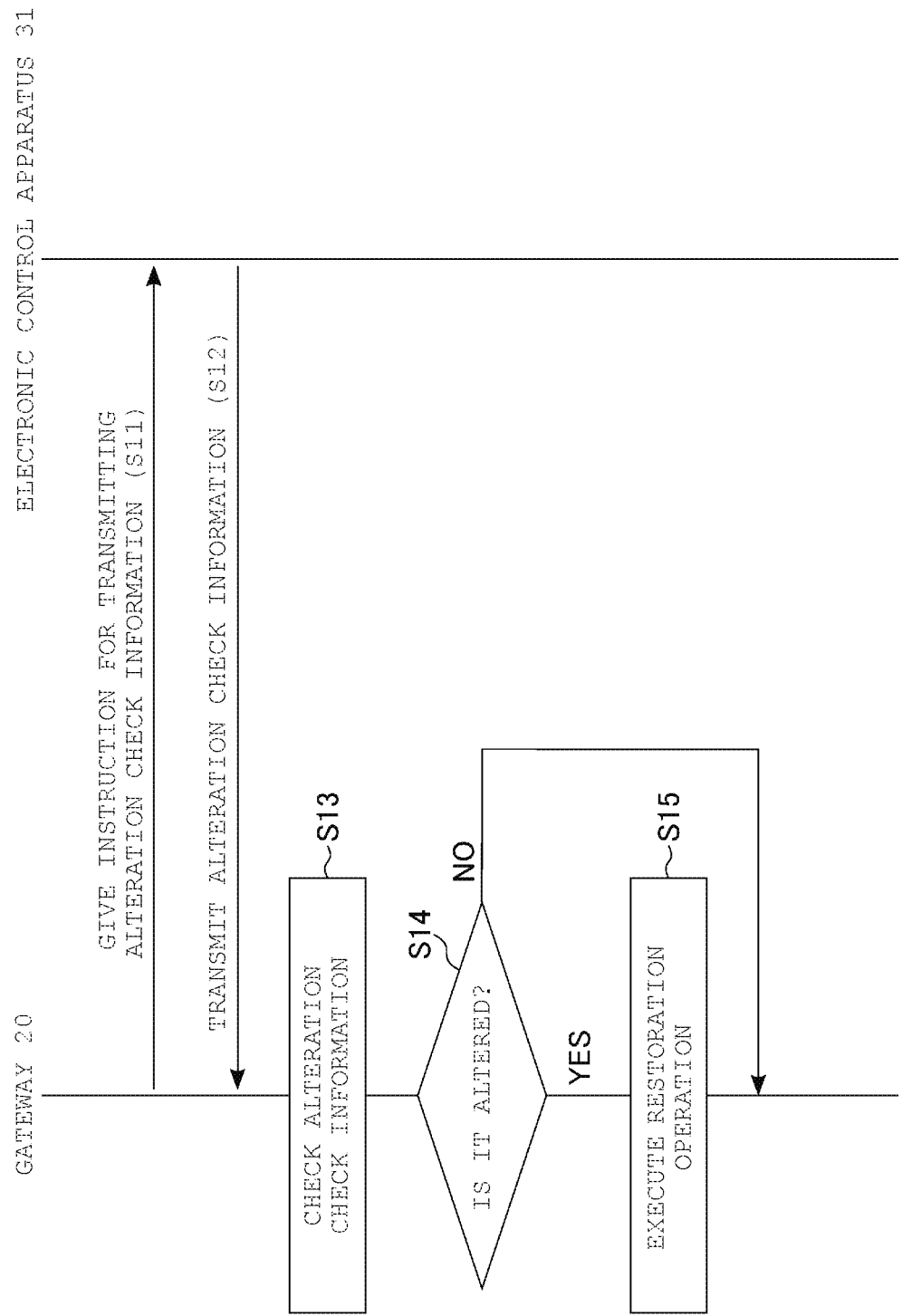
FIG. 5 is a flowchart of an alteration detection operation in the control system according to the first embodiment.

FIG. 5 illustrates a flow of an alteration detection operation in the control system 1 according to the first embodiment. The alteration detection operation in the first embodiment is executed by the gateway 20 and the electronic control apparatus 31.

Specifically, first, the gateway 20 instructs the electronic control apparatus 31 to transmit alteration check information (step S11). Then, the electronic control apparatus 31 transmits the alteration check information to the gateway 20 on the basis of the instruction of the gateway 20 (step S12). When the gateway 20 receives the alteration check information from the electronic control apparatus 31, the gateway checks the alteration check information (step S13).

The alteration check information is used to verify firmware executed by the electronic control apparatus. For example, the alteration check information includes a reference value for verification which is shared between the gateway 20 and the electronic control apparatus 31, and any appropriate reference value may be used. For example, when a message authentication code (MAC) is used for verification of firmware, a MAC value shared in advance between the gateway 20 and the electronic control apparatus 31 is equivalent to the alteration check information.

For example, when a reference value received from the electronic control apparatus 31 is consistent with the reference value shared in advance, the gateway 20 determines that the electronic control apparatus 31 is operating normally (no alteration) (step S14, NO). When the gateway 20 checks that the electronic control apparatus 31 is not altered, the gateway terminates the alteration detection operation.

On the other hand, when a reference value received from the electronic control apparatus 31 is not consistent with the reference value shared in advance, the gateway 20 determines that the electronic control apparatus 31 is not operating normally (altered) (step S14, YES). When the gateway 20 checks that the electronic control apparatus 31 is altered, the gateway subsequently executes a restoration operation for the altered electronic control apparatus 31 (step S15).

Figure 6:
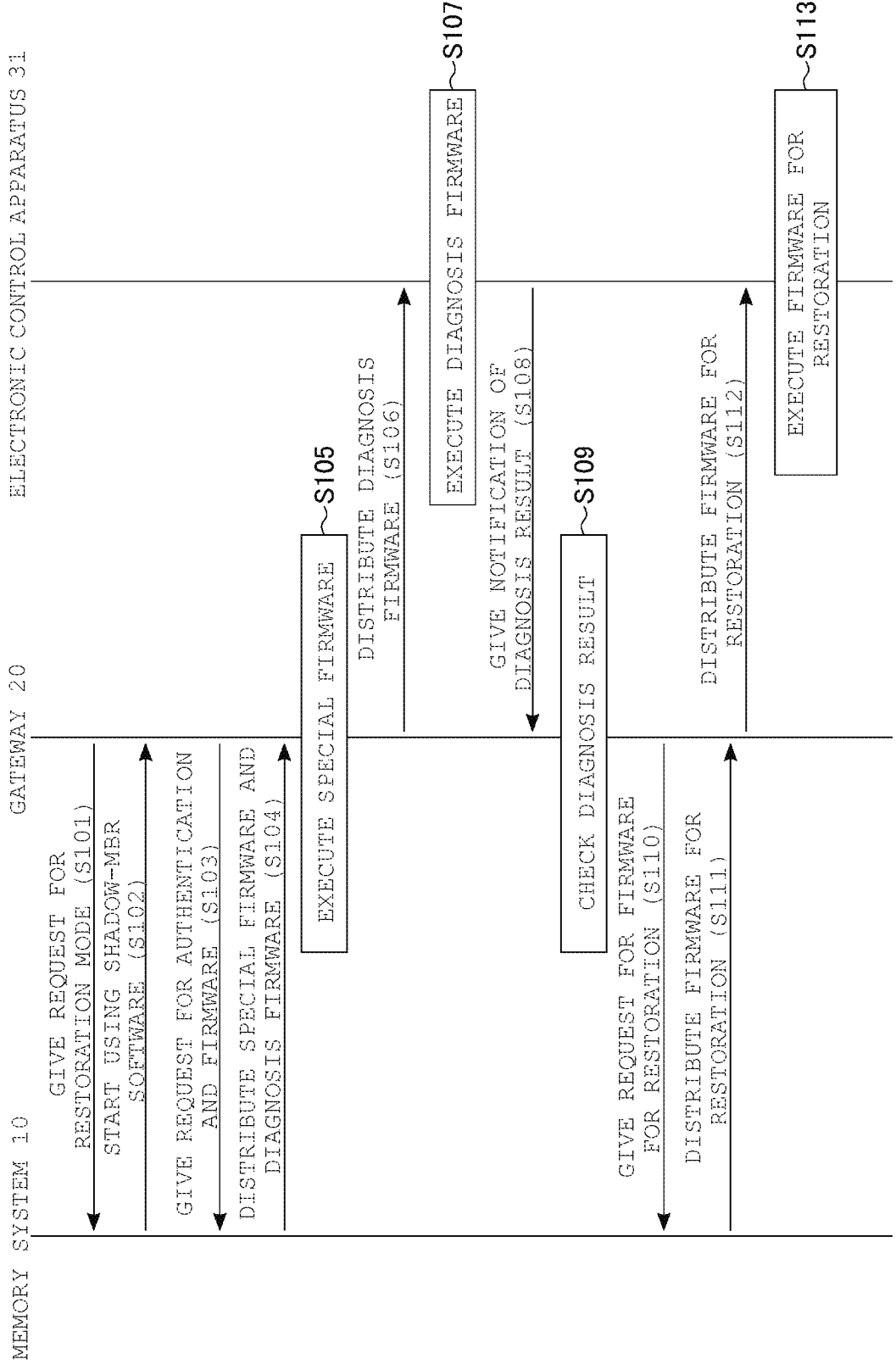
FIG. 6 is a flowchart of a restoration operation in the control system according to the first embodiment.

FIG. 6 illustrates a flow of a restoration operation in the control system 1 according to the first embodiment. The restoration operation in the first embodiment is executed by the memory system 10, the gateway 20, and the electronic control apparatus 31.

Specifically, first, the gateway 20 requests the memory system 10 to be started in a restoration mode (step S101). Then, the memory system 10 instructs the gateway 20 to be started (e.g. rebooted) using Shadow-MBR software on the basis of the request of the gateway 20 (step S102).

The gateway 20 is started using Shadow-MBR software on the basis of the instruction of the memory system 10, and requests the memory system 10 to authenticate equipment and distribute firmware (FW) when access to the Shadow-MBR region 19 is permitted (step S103). The memory system 10 receiving the request for authenticating equipment and distributing firmware first executes the authentication of the equipment and checks whether or not, for example, firmware executed by the gateway 20 is regular firmware.

For example, when the firmware is not regular firmware, the memory system 10 determines that the authentication of the equipment is not successful and rejects the distribution of the firmware. On the other hand, when the firmware is regular firmware, the memory system 10 determines that the authentication of the equipment is successful and distributes the special firmware and the diagnosis firmware stored in the Shadow-MBR region 19 to the gateway 20 (step S104).

When the gateway 20 receives the special firmware and the diagnosis firmware from the memory system 10, the gateway executes the received special firmware (step S105). The gateway 20 executing the special firmware is operated in a restoration mode. Then, the gateway 20 distributes the diagnosis firmware distributed from the memory system 10 to the electronic control apparatus 31 (step S106).

When the electronic control apparatus 31 receives the diagnosis firmware from the gateway 20, the electronic control apparatus executes the received diagnosis firmware and executes a self-diagnosis operation (step S107). In the self-diagnosis operation, the electronic control apparatus 31 self-diagnoses what kind of abnormality occurs before the diagnosis firmware is executed. In the self-diagnosis operation, for example, a part where a hardware failure occurs in the electronic control apparatus 31, a part where firmware is altered, or the like is specified.

When the self-diagnosis operation is completed, the electronic control apparatus 31 notifies the gateway 20 of a diagnosis result of the self-diagnosis operation (step S108). When the gateway 20 receives the diagnosis result of the self-diagnosis operation from the electronic control apparatus 31, the gateway checks the diagnosis result (step S109). In the checking of the diagnosis result, the gateway 20 determines firmware suitable as firmware for restoration for the electronic control apparatus 31 which is a target of restoration.

For example, when the firmware of the electronic control apparatus 31 is altered, the gateway 20 determines that normal firmware is appropriate as the firmware for restoration of the electronic control apparatus 31. On the other hand, when a failure occurs in a portion of the hardware of the electronic control apparatus 31, the gateway 20 determines that degeneration firmware is appropriate as the firmware for restoration of the electronic control apparatus 31.

When the checking of the diagnosis result is completed, the gateway 20 requests the memory system 10 to distribute the firmware for restoration (step S110). When the request for distributing the firmware for restoration is given, the memory system 10 distributes the firmware for restoration (normal firmware or degeneration firmware) stored in the normal region 18 to the gateway 20 (step S111). Then, the gateway 20 distributes the firmware for restoration distributed from the memory system 10 to the electronic control apparatus 31 (step S112).

When the electronic control apparatus 31 receives the firmware for restoration from the gateway 20, the electronic control apparatus executes the received firmware for restoration (step S113). That is, the electronic control apparatus 31 is started again with the normal firmware or the degeneration firmware and is operated in a normal mode or degeneration mode which is not altered. In addition, when the control system 1 checks that the electronic control apparatus 31 is started with the firmware for restoration, the control system terminates the restoration operation.

As described above, the control system 1 according to the first embodiment can execute the alteration detection operation and the restoration operation. The control system 1 executes, for example, the alteration detection operation on a regular basis (e.g. at a predetermined interval). In addition, the alteration detection operation may be executed on the basis of a user's operation.

Further, a case where the alteration detection operation and the restoration operation for the electronic control apparatus 31 in the ECU set 30 are executed is described above, but the alteration detection operation and the restoration operation may also be executed for the other electronic control apparatuses in the ECU set 30.

Further, a case where the authentication of the equipment and the giving of the request for firmware are simultaneously performed in the process of step S103 is described, but those processes need not be simultaneous. For example, the gateway 20 may give a request for distributing firmware after the authentication of the equipment is completed. Although description is given of a case where the gateway 20 determines whether or not authentication is successful depending on whether or not the firmware being executed is regular firmware in the authentication of the equipment between the memory system 10 and the gateway 20, other authentication methods may be used. For example, the authentication of the equipment between the memory system 10 and the gateway 20 may be performed using an account. In this case, regarding an account of the gateway 20 by which access to the Shadow-MBR region 19 is permitted, an account different from an account used during a normal operation of the control system 1 is set.

[1-3] Effects of First Embodiment

According to the above-described control system 1 according to the first embodiment, it is possible to improve safety. Hereinafter, details of the effects of the first embodiment will be described.

For example, when a control system of a car is electronically controlled, electronic control apparatuses are provided in correspondence to respective control systems. These electronic control apparatuses are connected to a gateway. In addition, the car is operated by the electronic control apparatuses, controlling the respective control systems, being associated with each other through the gateway. There is a concern that the car with a network including such electronic control apparatuses and gateway may not be operated normally when software executed by the electronic control apparatuses is altered.

On the other hand, in the control system 1 according to the first embodiment, the gateway 20 checks the state of the electronic control apparatus through an alteration detection operation on the regular basis. In addition, when the gateway 20 confirms that an abnormality occurs in the electronic control apparatus through an alteration detection operation, the gateway executes a restoration operation for the electronic control apparatus. In the restoration operation, the electronic control apparatus having an abnormality occurred therein executes firmware for restoration received from the gateway 20, so that the electronic control apparatus can be restored from an abnormality state to a normal state.

As a location where firmware for such a restoration operation is stored, for example, the normal region 18 in the memory system 10 is conceivable. However, since the normal region 18 is accessible during a normal operation, there is a concern that the firmware for a restoration operation may be abused when the gateway 20 is altered.

On the other hand, the control system 1 according to the first embodiment stores firmware used for a restoration operation, that is, a set including special firmware corresponding to the gateway 20 and diagnosis firmware corresponding to the electronic control apparatus 31 in the Shadow-MBR region 19 in the memory system 10. The Shadow-MBR region 19 is accessible after mutual authentication between the memory system 10 and the gateway 20 is performed, and for example, an account of the gateway 20 which is used at the time of start using Shadow-MBR software is different from that at the time of a normal operation.

As described above, in the control system 1 according to the first embodiment, firmware used for a restoration operation is stored in a region to which an access authority is not imparted at the time of a normal operation. For this reason, in the control system 1 according to the first embodiment, there is no concern that special firmware and diagnosis firmware stored in the Shadow-MBR region 19 may be abused also when the gateway 20 is altered at the time of a normal operation. Therefore, the control system 1 according to the first embodiment can improve safety.

In addition, regarding the Shadow-MBR region 19 in the memory system 10, a storage capacity can be increased at lower costs than that of the ROM 22 in the gateway 20. For this reason, the Shadow-MBR region 19 can store firmware for restoration (special firmware and diagnosis firmware) with a marginal increase in cost, and it is possible to reduce the volume of data stored in the ROM 22 in the gateway 20.

In addition, the same operations as those of the control system 1 according to the first embodiment may be executed by updating software of the existing hardware. That is, the control system 1 according to the first embodiment may be provided by updating Shadow-MBR software and storing special firmware and diagnosis firmware in a Shadow-MBR region.

[2] Second Embodiment

A control system 1 according to a second embodiment causes a gateway 20 to execute the alteration detection operation described in the first embodiment by using a watchdog. Hereinafter, differences between the control system 1 according to the first embodiment and the control system 1 according to the second embodiment will be described.

[2-1] Configuration

Figure 7:
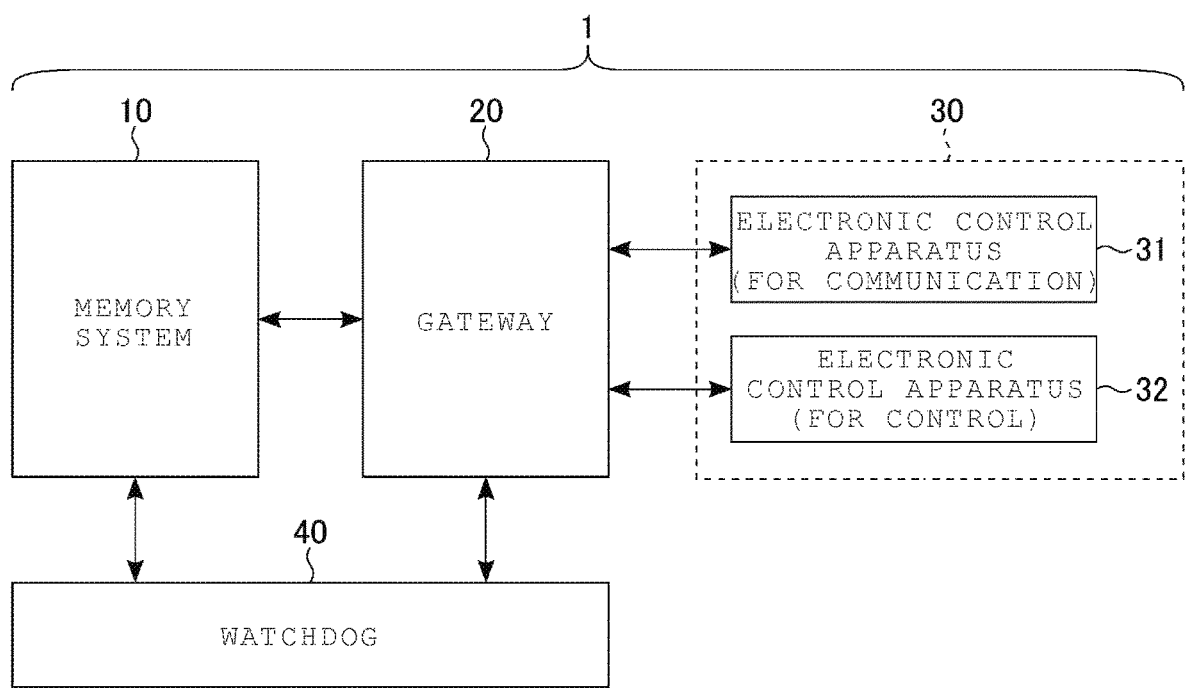
FIG. 7 is a block diagram of a control system according to a second embodiment.

FIG. 7 illustrates a configuration example of the control system 1 according to the second embodiment. The control system 1 according to the second embodiment further includes a watchdog 40 in addition to the configuration of the control system 1 according to the first embodiment.

The watchdog 40 is connected to each of a memory system 10 and the gateway 20 and monitors whether or not the control system 1 is operating normally. Specifically, the watchdog 40 monitors whether or not the gateway 20 is operating normally on a regular basis. In addition, the watchdog 40 commands the memory system 10 to start a restoration operation on the basis of a result of the monitoring of the gateway 20.

The other configurations of the control system 1 according to the second embodiment are the same as the configurations of the control system 1 according to the first embodiment, and thus the redundant description thereof will be omitted.

[2-2] Operations

Next, details of an alteration detection operation and a restoration operation in the control system 1 according to the second embodiment will be described. Further, in the description of operations in the control system 1 according to the second embodiment, a case where an alteration detection operation and a restoration operation for an electronic control apparatus 31 in an ECU set 30 are executed will be described.

Figure 8:
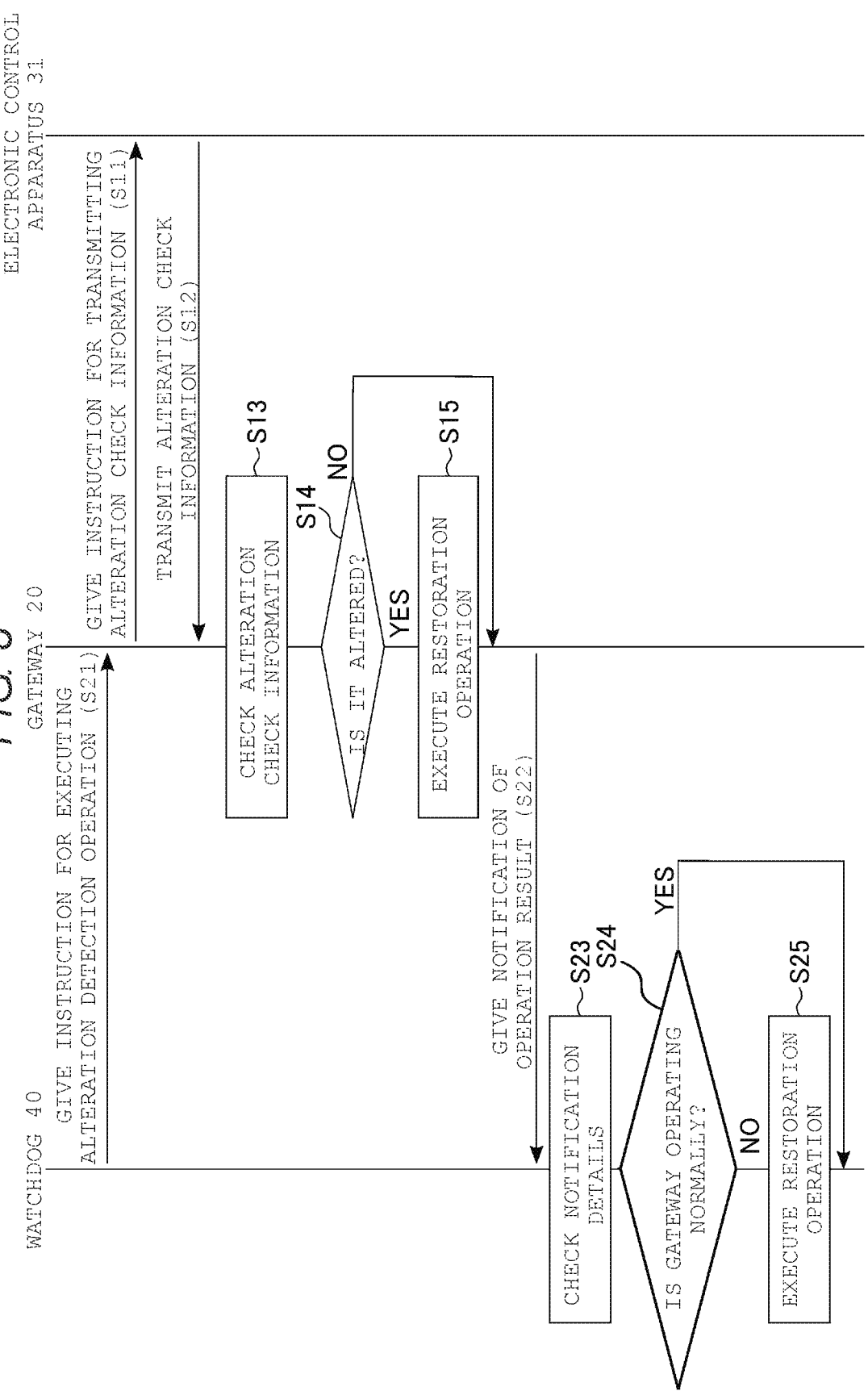
FIG. 8 is a flowchart of an alteration detection operation in the control system according to the second embodiment.

FIG. 8 illustrates a flow of an alteration detection operation in the control system 1 according to the second embodiment. The alteration detection operation in the second embodiment is executed by the gateway 20, the electronic control apparatus 31, and the watchdog 40.

Specifically, first, the watchdog 40 instructs the gateway 20 to execute the alteration detection operation (step S21). Then, the gateway 20 executes the same alteration detection operation as that in the first embodiment on the basis of the instruction of the watchdog 40. That is, the processes of steps S11 to S14 described in the first embodiment are executed in order, and the process of step S15 is appropriately executed.

When the alteration detection operation is terminated, the gateway 20 notifies the watchdog 40 of an operation result (step S22). When the watchdog 40 receives the operation result from the electronic control apparatus 31, the watchdog checks notification details (step S23). In the checking of the notification details, it may be able to be determined whether or not a response of the gateway 20 based on at least the instruction of the watchdog 40 is normal, and any appropriate checking method may be used. For example, in the checking of the notification details, the same mutual authentication as that for alteration check information may be executed, and results of the alteration detection operation may be checked.

When the watchdog 40 determines that an abnormality does not occur in the control system 1, that is, when the gateway 20 is operating normally (step S24, YES), the alteration detection operation is terminated. In addition, the watchdog 40 instructs the gateway 20 to execute the alteration detection operation at predetermined intervals after the alteration detection operation is terminated.

On the other hand, when the watchdog 40 determines that an abnormality occurs in the control system 1, that is, when the gateway 20 is not operating normally (step S24, NO), a restoration operation is executed subsequently (step S25).

Figure 9:
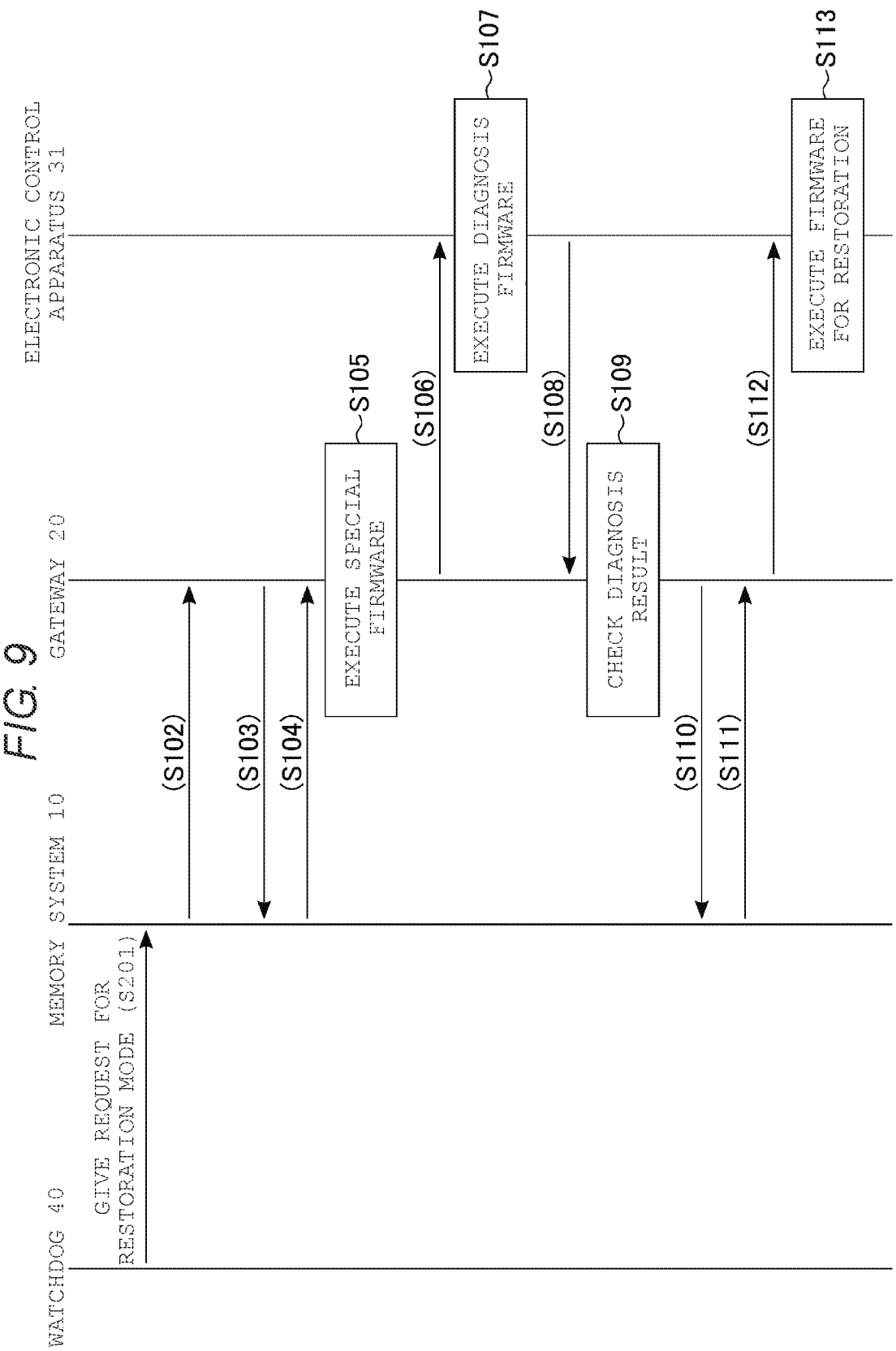
FIG. 9 is a flowchart of a restoration operation in the control system according to the second embodiment.

FIG. 9 illustrates a flow of a restoration operation in the control system 1 according to the second embodiment. In the restoration operation in the second embodiment, the same restoration operation as that in the first embodiment is started except with the watchdog 40 as a starting point.

Specifically, first, the watchdog 40 requests the memory system 10 to start the gateway 20 in a restoration mode (step S201). Then, the processes of step S102 to S105 are executed in order, whereby the gateway 20 is started in a restoration mode. Operations in step S105 and the subsequent steps in the control system 1 according to the second embodiment are the same as the restoration operation described in the first embodiment, and thus the redundant description thereof will be omitted.

As described above, the control system 1 according to the second embodiment executes an alteration detection operation and a restoration operation with the watchdog 40 as a starting point. The watchdog 40 causes the gateway 20 to execute the alteration detection operation on a regular basis and causes the memory system 10 to start the restoration operation as necessary.

Further, although a case where an alteration detection operation and a restoration operation are executed for the electronic control apparatus 31 in the ECU set 30 is described above, the alteration detection operation and the restoration operation based on the instruction of the watchdog 40 may also be executed for the other electronic control apparatuses in the ECU set 30.

In addition, description is given of a case where it is determined whether or not the gateway 20 is operating normally by the watchdog 40 checking notification details of the gateway 20 in the process of step S22, but is not limited thereto. For example, the watchdog 40 may determine that the gateway 20 is not operating normally when a response from the gateway 20 is not given in a predetermined period after instructing the gateway to execute the alteration detection operation in the process of step S21. In this case, the watchdog 40 starts to execute the restoration operation without waiting for a response from the gateway 20. In addition, the watchdog 40 may determine whether or not the gateway 20 is operating normally by causing the gateway 20 to transmit a signal on a regular basis. In this case, the watchdog 40 determines that the gateway 20 is in an abnormal state when a signal cannot be received from the gateway 20 at a fixed cycle.

[2-3] Effects of Second Embodiment

When the gateway 20 is altered in the control system 1, there is a concern that an alteration detection operation may be skipped. In this case, the control system 1 may not be able to restore the altered electronic control apparatus 31, and thus there is a possibility that a car or the like may not be operated normally.

On the other hand, the control system 1 according to the second embodiment further includes the watchdog 40. The watchdog 40 instructs the gateway 20 to execute an alteration detection operation of the electronic control apparatus 31 on a regular basis. In addition, the watchdog 40 checks whether or not a response is given from the gateway 20 within a predetermined period after the instruction is given.

Thereby, the control system 1 according to the second embodiment can detect whether or not an abnormality occurs in the gateway 20. Further, also when the gateway 20 is altered, the watchdog 40 forcibly starts the gateway 20 again using Shadow-MBR software and can operate the gateway 20 normally. As a result, the control system 1 according to the second embodiment can execute a restoration operation for the electronic control apparatus 31. Therefore, the control system 1 according to the second embodiment can more improve reliability of the control system 1 than in the first embodiment.

[3] Third Embodiment

A configuration of a control system 1 according to a third embodiment is the same as that of the control system 1 according to the first embodiment. The control system 1 according to the third embodiment starts an alteration detection operation in another electronic control apparatus on the basis of a result of an alteration detection operation in a specific electronic control apparatus. Hereinafter, differences between the control system 1 according to the third embodiment and the control systems 1 according to the first and second embodiments will be described.

[3-1] Operations

Figure 10:
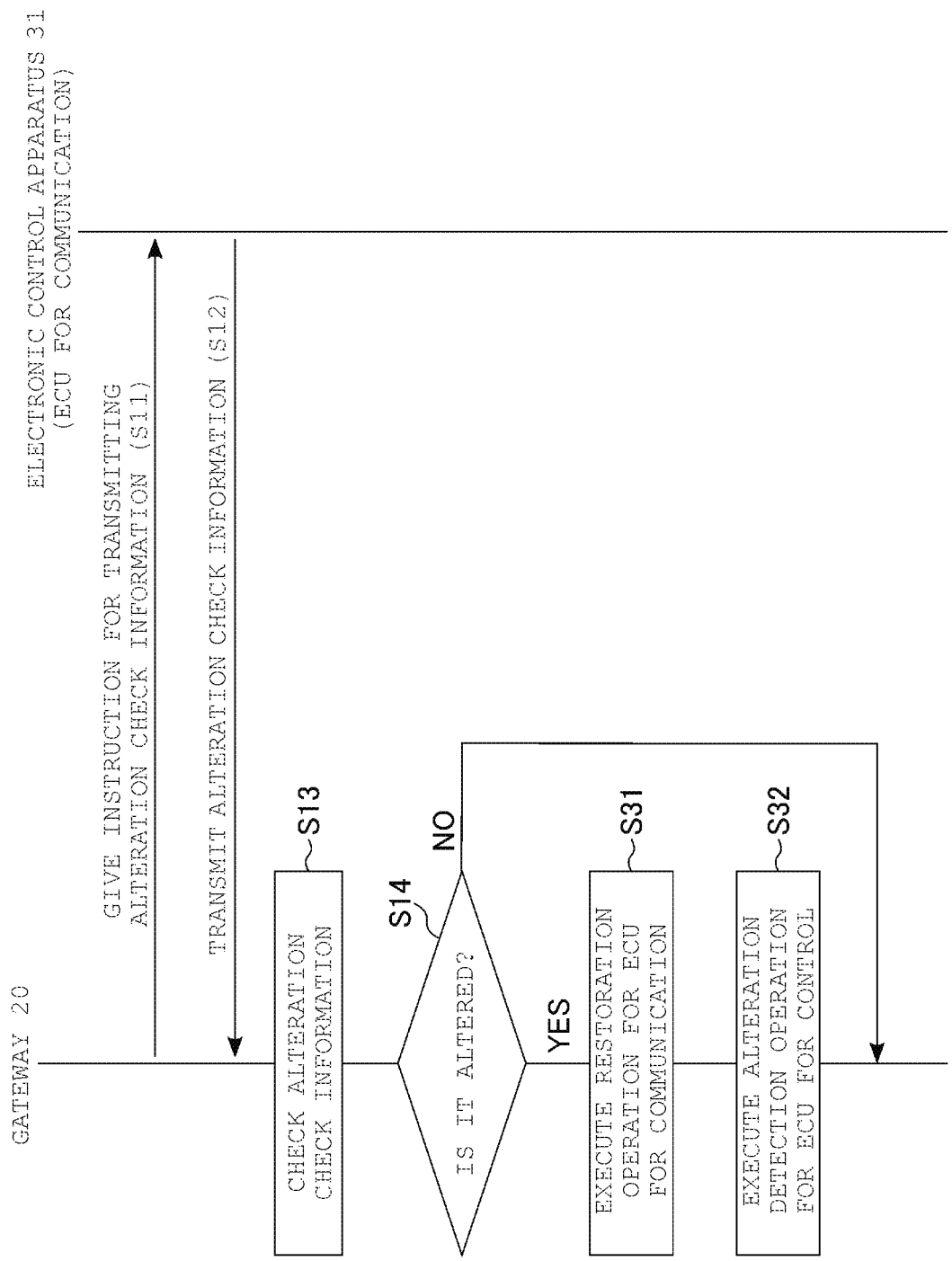
FIG. 10 is a flowchart of an alteration detection operation in a control system according to a third embodiment.

FIG. 10 illustrates a flow of an alteration detection operation in the control system 1 according to the third embodiment. In the alteration detection operation in the third embodiment, an alteration detection operation for another electronic control apparatus 32 is inserted after a restoration operation of the electronic control apparatus 31 which is a target for an alteration detection operation, with respect to the alteration detection operation in the first embodiment.

Specifically, first, similarly to the first embodiment, the processes of steps S11 to S13 are executed in order. Further, when the electronic control apparatus 31 is operating normally (step S14, NO), the gateway 20 terminates the alteration detection operation. On the other hand, when the electronic control apparatus 31 is not operating normally (step S14, YES), the gateway 20 executes a restoration operation for the electronic control apparatus 31 for communication (step S31).

Details of the restoration operation in step S31 are the same as the details of the restoration operation in step S15 described in the first embodiment, and thus the redundant description thereof will be omitted. When the restoration operation in step S31 is terminated, the gateway 20 subsequently executes an alteration detection operation for the electronic control apparatus 32 for control (or for another electronic control apparatus) (step S32). Details of the alteration detection operation in step S32 are the same as the details of the alteration detection operation described in the first embodiment, and thus the redundant description thereof will be omitted.

Further, when the ECU set 30 includes a plurality of ECUs for control, the gateway 20 may execute a restoration operation for an ECU for communication and then execute alteration detection operations of selecting the respective plurality of ECUs for control in order. The ECUs for control for which an alteration detection operation is executed after a restoration operation for the ECU for communication may be freely selected in accordance with design specifications.

[3-2] Effects of Third Embodiment

The control system 1 built in, for example, a car, includes, for example, the electronic control apparatus 31 for communication and the electronic control apparatus 32 for control. In such a control system 1, the electronic control apparatus 31 for communication is configured to be capable of communicating with an external network, and thus there is a heightened risk of unauthorized access and alteration. In other words, there is a heightened likelihood that the electronic control apparatus 31 for communication may be attacked from the outside. Further, in a case where the electronic control apparatus 31 for communication is altered, there is a heightened likelihood that the other electronic control apparatuses 32 for control may be altered.

On the other hand, the control system 1 according to the third embodiment preferentially executes an alteration detection operation for the electronic control apparatus 31 for communication. Further, when a restoration operation for the electronic control apparatus 31 for communication is executed, the control system 1 according to the third embodiment subsequently executes an alteration detection operation for the electronic control apparatus 32 for control. That is, the control system 1 according to the third embodiment rapidly executes an alteration detection operation for the electronic control apparatus 32 for control which is more likely to be altered given the state of the electronic control apparatus 31.

Thereby, the control system 1 according to the third embodiment can detect an abnormality occurring in the system in a short period of time. As a result, the control system 1 according to the third embodiment can restore an electronic control apparatus which is altered or has an abnormality occurring therein in a short period of time and can improve safety of the control system 1.

[4] Fourth Embodiment

A control system 1 according to a fourth embodiment executes a restoration operation for allocating an operation allocated to an electronic control apparatus not operating normally to another electronic control apparatus. Hereinafter, differences between the control system 1 according to the fourth embodiment and the control systems 1 according to the first to third embodiments will be described.

[4-1] Configuration

Figure 11:
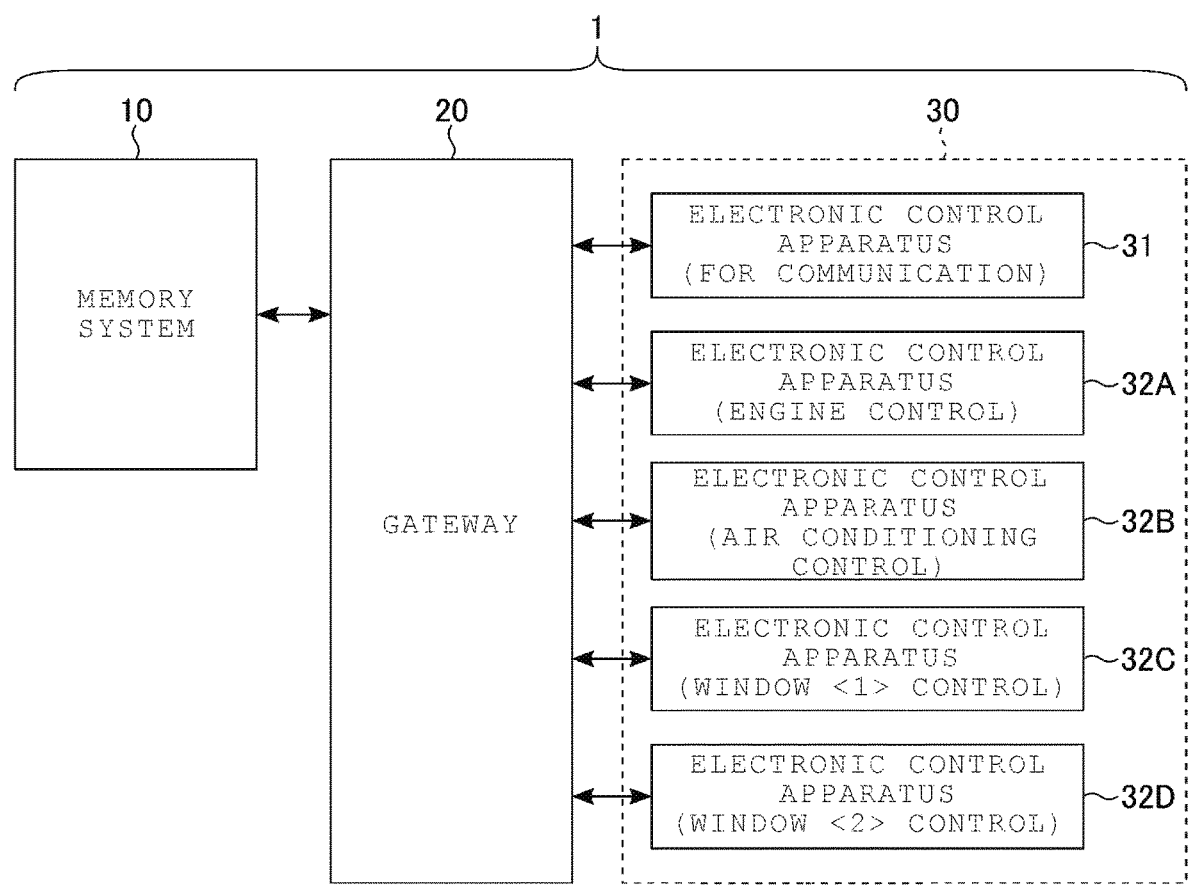
FIG. 11 is a block diagram of a control system according to a fourth embodiment.
Figure 12:
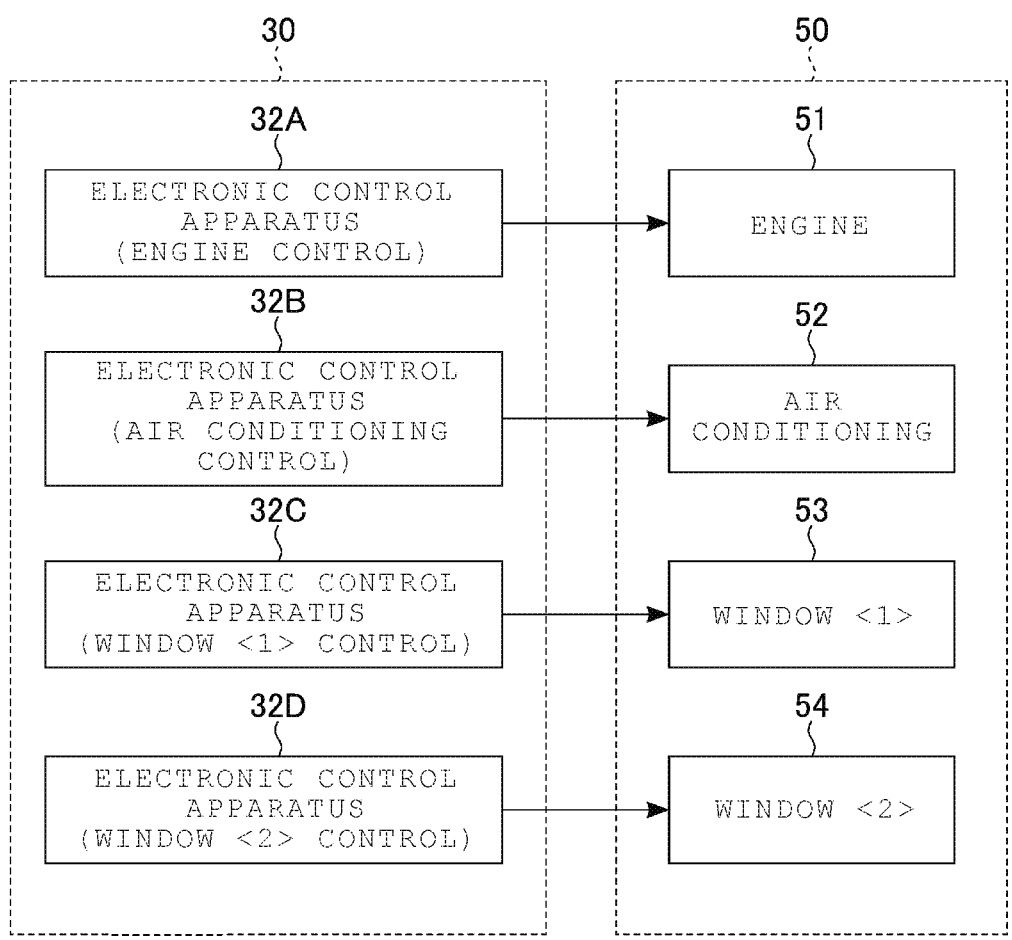
FIG. 12 is a block diagram illustrating an example of a normal operation state in the control system according to the fourth embodiment.

In the fourth embodiment, a case where the control system 1 controls a car 50 will be described. FIG. 11 illustrates a configuration example of the control system 1 according to the fourth embodiment. FIG. 12 illustrates a configuration example of the car 50 which is controlled by the control system 1 according to the fourth embodiment.

The control system 1 according to the fourth embodiment has a configuration in which a plurality of electronic control apparatuses 32 for control is added with respect to the configuration of the control system 1 according to the first embodiment. Specifically, in the control system 1 according to the fourth embodiment, an ECU set 30 includes electronic control apparatuses 31, 32A, 32B, 32C, and 32D. The car 50 controlled by the control system 1 according to the fourth embodiment includes an engine 51, an air conditioning 52, a window <1> 53, and a window <2> 54.

Each of the electronic control apparatuses 32A, 32B, 32C, and 32D is connected to a gateway 20. The electronic control apparatus 32A is an ECU that executes firmware corresponding to the control of the engine 51. The electronic control apparatus 32B is an ECU that executes firmware corresponding to the control of the air conditioning 52. The electronic control apparatus 32C is an ECU that executes firmware corresponding to the control of the window <1> 53. The electronic control apparatus 32D is an ECU that executes firmware corresponding to the control of the window <2> 54.

As described above, in the car 50 in this example, the engine 51, the air conditioning 52, the window <1> 53, and the window <2> 54 are respectively controlled by the electronic control apparatuses 32A, 32B, 32C, and 32D. The other configurations of the control system 1 according to the fourth embodiment are the same as the configurations of the control system 1 according to the first embodiment, and thus the redundant description thereof will be omitted. In addition, a configuration in which the car 50 is controlled by the control system 1 is not limited to the configuration described above, and the other configurations may be controlled by the control system 1.

[4-2] Operations

Figure 13:
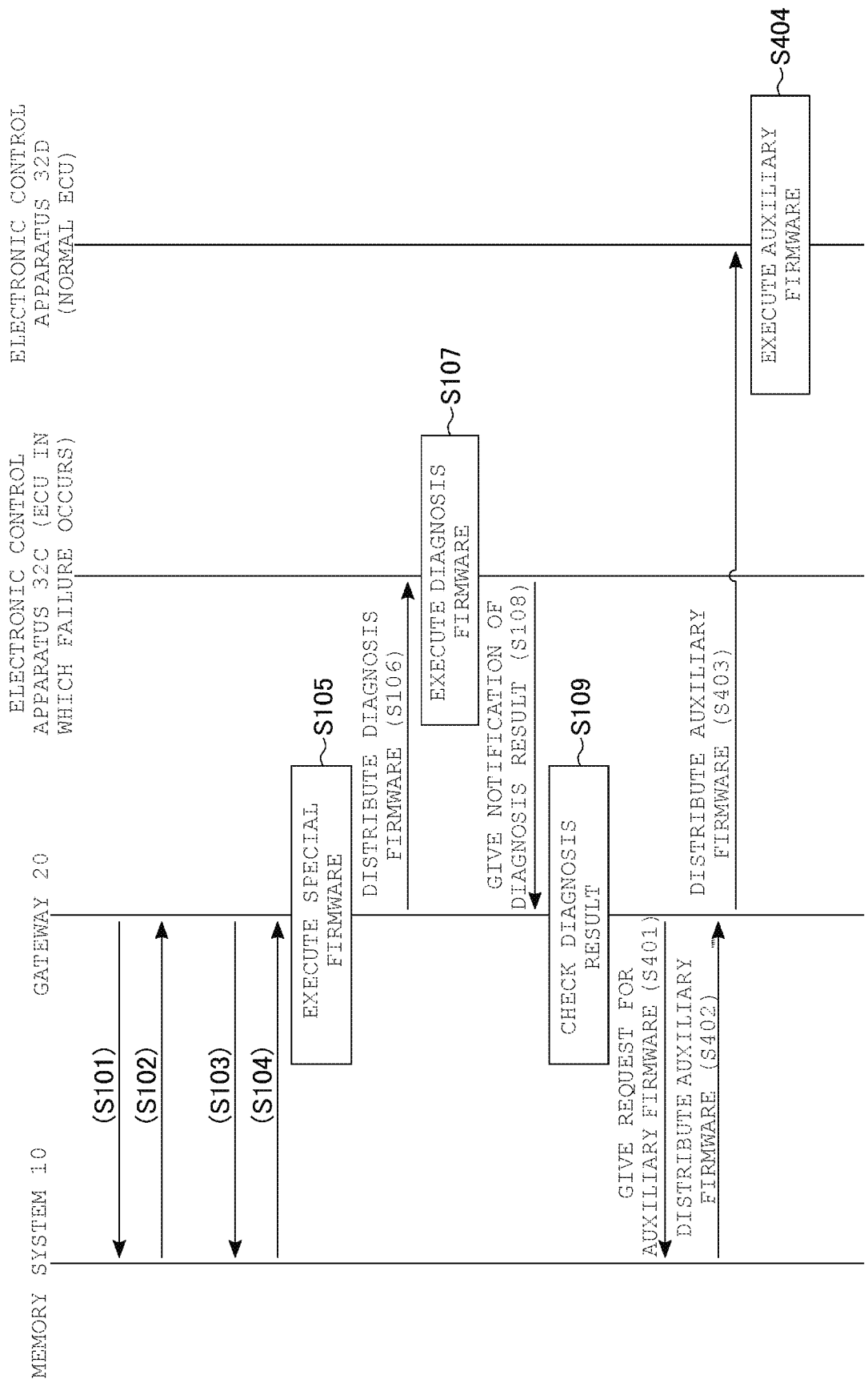
FIG. 13 is a flowchart of a restoration operation in the control system according to the fourth embodiment.

FIG. 13 illustrates a flow of a restoration operation in the control system 1 according to the fourth embodiment. Further, in the following description, description will be given of a case where a failure occurs in the electronic control apparatus 32C, the electronic control apparatus 32D is in a normal state, and a restoration operation for the electronic control apparatus 32C is executed.

First, similarly to the first embodiment, the processes of steps S101 to S108 are executed in order. That is, the gateway 20 is started using Shadow-MBR software, and the electronic control apparatus 32C executes a self-diagnosis operation on the basis of diagnosis firmware transmitted from a Shadow-MBR region 19 in a memory system 10 through the gateway 20. In addition, when the gateway 20 receives a diagnosis result of the self-diagnosis operation from the electronic control apparatus 32C, the gateway checks the diagnosis result (step S109).

In the process of step S109, the gateway 20 ascertains that a failure occurs in the electronic control apparatus 32C. Then, the gateway 20 requests the memory system 10 to distribute auxiliary firmware (step S401). In this example, the auxiliary firmware is firmware including a control function allocated to the electronic control apparatus 32D which is a distribution destination of the firmware and a control function allocated to the electronic control apparatus 32C in which a failure occurs. That is, in the electronic control apparatus executing the auxiliary firmware, a function controlled by the electronic control apparatus having a failure occurring therein is added with respect to a state before the auxiliary firmware is executed.

When the request for distributing auxiliary firmware is given, the memory system 10 distributes auxiliary firmware stored in a normal region 18 to the gateway 20 (step S402). Then, the gateway 20 distributes the auxiliary firmware distributed from the memory system 10 to the electronic control apparatus 32D (step S403).

When the electronic control apparatus 32D receives the auxiliary firmware from the gateway 20, the electronic control apparatus executes the received auxiliary firmware (step S404). The electronic control apparatus 32D executing the auxiliary firmware starts to control both equipment controlled by the electronic control apparatus 32D and equipment controlled by the electronic control apparatus 32C. In addition, when the control system 1 checks that the electronic control apparatus 32D is started using the auxiliary firmware, the restoration operation is terminated.

Figure 14:
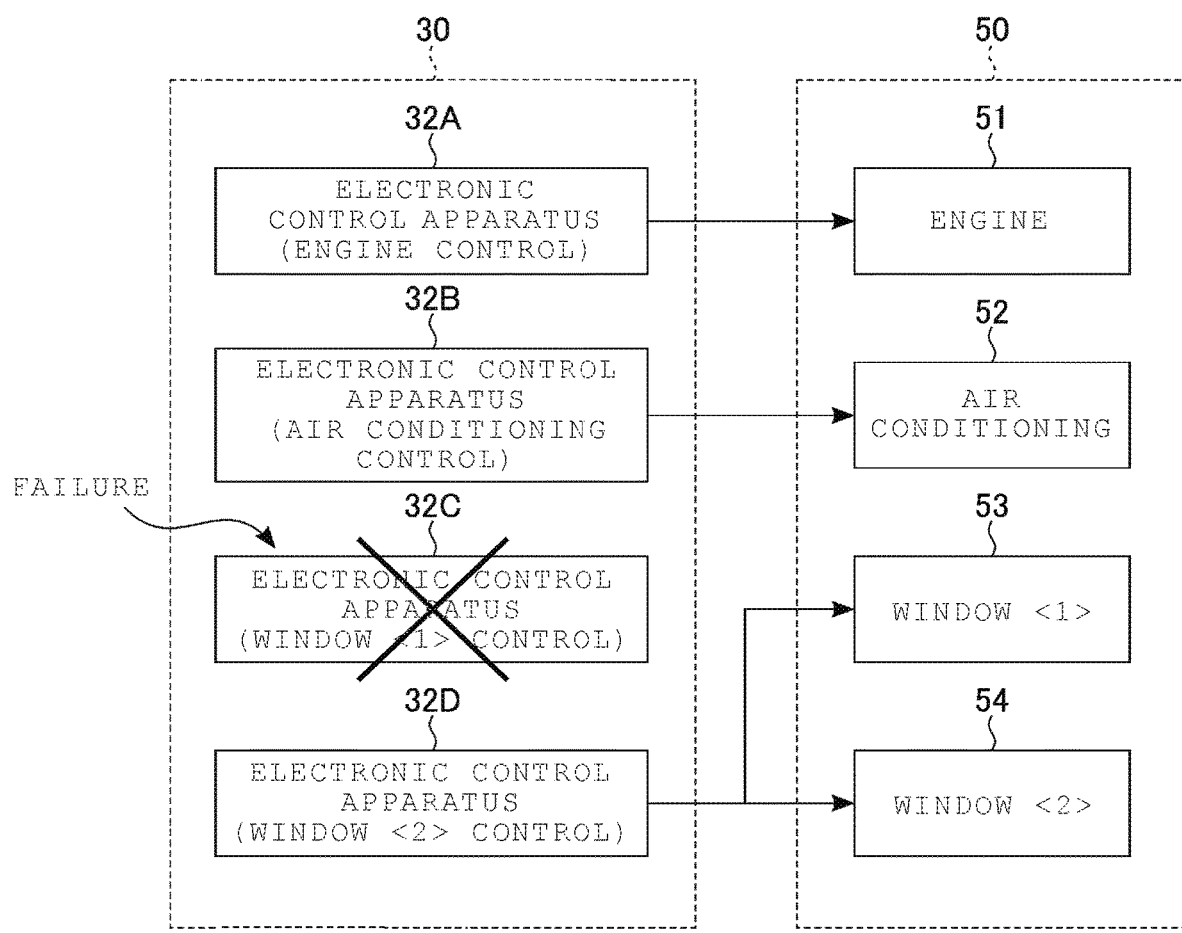
FIG. 14 is a block diagram illustrating an example of an operation state in the control system according to the fourth embodiment.

FIG. 14 illustrates a relationship between the control system 1 and the car 50 after the restoration operation described with reference to FIG. 13 is executed. In this example, the window <1> 53 controlled by the electronic control apparatus 32C is controlled by the electronic control apparatus 32D. That is, the electronic control apparatus 32D is operated as an electronic control apparatus that controls both the window <1> and the window <2>.

Further, a case where the electronic control apparatus 32D controls the window <1> and the window <2> by executing auxiliary firmware is described above, but the present disclosure is not limited thereto. A normal electronic control apparatus may be selected as an electronic control apparatus that executes auxiliary firmware. As the normal electronic control apparatus, for example, an electronic control apparatus in which an abnormality is not detected in a predetermined period is selected.

[4-3] Effects of Fourth Embodiment

When a failure occurs in an electronic control apparatus in the control system 1, there is a concern that equipment allocated to the electronic control apparatus may not be operated appropriately.

Consequently, in the control system 1 according to the fourth embodiment, control allocated to the electronic control apparatus 32 having an abnormality occurring therein is imposed on another electronic control apparatus 32. In other words, the control system 1 according to the fourth embodiment causes an equipment controlled by the electronic control apparatus 32 for control having an abnormality occurring therein to be controlled using another electronic control apparatus 32.

Thereby, in the control system 1 according to the fourth embodiment, also when an abnormality occurs in the electronic control apparatus 32, it is possible to operate an equipment allocated to the electronic control apparatus 32. As a result, the control system 1 according to the fourth embodiment can prevent equipment corresponding to the electronic control apparatus 32 having an abnormality occurring therein from being uncontrollable and to improve safety of the control system 1.

Further, a case where the electronic control apparatus 32 to which control of one equipment is allocated controls two equipments by executing auxiliary firmware is described above, but the number of equipments controlled by one electronic control apparatus 32 may be three or more. There is a possibility that processing performed by the electronic control apparatus 32 controlling a plurality of equipments may be delayed due to an increase in a load. For this reason, it is preferable that control allocated to the electronic control apparatus 32 having an abnormality occurring therein may be imposed on the electronic control apparatus 32 having a capacity for additional processing. For example, in a car, it is preferable that the electronic control apparatus 32 taking charge of a control system of an engine may not be caused to execute firmware for controlling a plurality of control systems if doing so would overload the electronic control apparatus 32.

In addition, a case where auxiliary firmware is firmware having a function of controlling equipments of two types is described above as an example, but the present disclosure is not limited thereto. In the control system 1 according to the fourth embodiment, auxiliary firmware may have a function of controlling equipment allocated to an electronic control apparatus in which an abnormality occurs, and the function may be added to an electronic control apparatus that executes the auxiliary firmware.

[5] Fifth Embodiment

A control system 1 according to a fifth embodiment executes a restoration operation of allocating an operation allocated to an electronic control apparatus not operating normally to a backup electronic control apparatus. Hereinafter, differences between the control system 1 according to the fifth embodiment and the control systems according to the first to fourth embodiments will be described.

[5-1] Configuration

Figure 15:
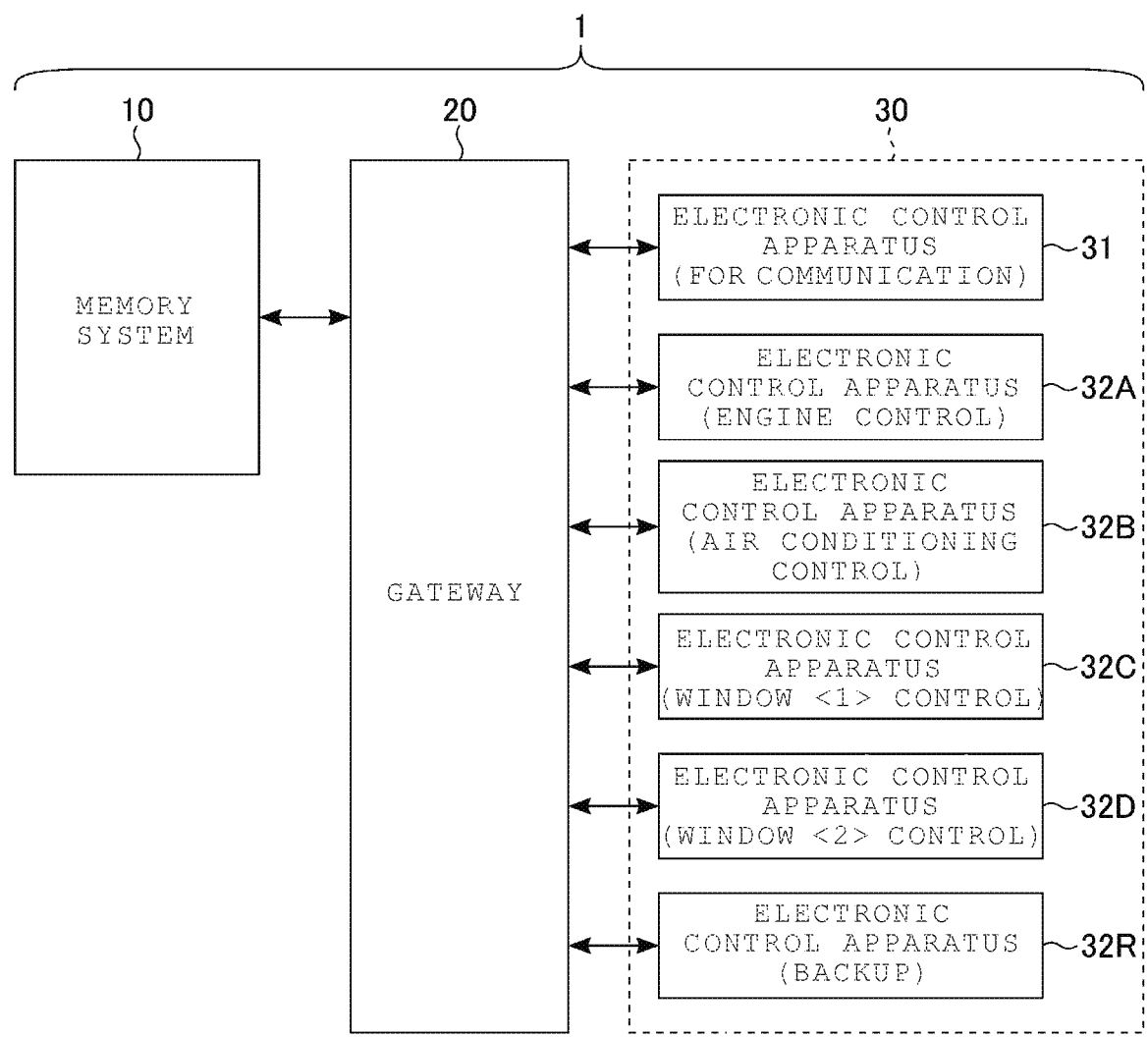
FIG. 15 is a block diagram of a control system according to a fifth embodiment.

FIG. 15 illustrates a configuration example of the control system 1 according to the fifth embodiment. The control system 1 according to the fifth embodiment has a configuration in which an electronic control apparatus 32R is added with respect to the control system 1 according to the fourth embodiment.

The electronic control apparatus 32R is a backup ECU. The electronic control apparatus 32R can execute firmware to control equipment corresponding to the firmware, similar to other electronic control apparatuses. The electronic control apparatus 32R may be, to at least some degree, idle or not used when an electronic control apparatus having an abnormality occurring therein is not in an ECU set 30. On the other hand, the electronic control apparatus 32R is used instead of an electronic control apparatus having an abnormality occurring therein, when an electronic control apparatus having an abnormality occurring therein is in the ECU set 30. The other configurations of the control system 1 according to the fifth embodiment are the same as the configurations of the control system 1 according to the fourth embodiment, and thus the redundant description thereof will be omitted.

[5-2] Operations

FIG. 16 illustrates a flow of a restoration operation in the control system 1 according to the fifth embodiment. Further, in the following description, a case where a failure occurs in the electronic control apparatus 32B and a restoration operation is executed for the electronic control apparatus 32B will be described.

First, similarly to the first embodiment, the processes of steps S101 to S108 are executed in order. That is, the gateway 20 is started using Shadow-MBR software, and the electronic control apparatus 32B executes a self-diagnosis operation on the basis of diagnosis firmware transmitted from a Shadow-MBR region 19 in a memory system 10 through the gateway 20. In addition, when the gateway 20 receives a diagnosis result of the self-diagnosis operation from the electronic control apparatus 32B, the gateway 20 checks the diagnosis result (step S109).

In the process of step S109, the gateway 20 ascertains that a failure occurs in the electronic control apparatus 32B. Then, the gateway 20 requests the memory system 10 to distribute substitute firmware (step S501). In this example, the substitute firmware is normal firmware or degeneration firmware having a control function allocated to the electronic control apparatus 32B.

When the request for distributing the substitute firmware is given, the memory system 10 distributes substitute firmware stored in a normal region 18 to the gateway 20 (step S502). Then, the gateway 20 distributes the substitute firmware distributed from the memory system 10 to the electronic control apparatus 32R (step S503).

When the electronic control apparatus 32R receives the substitute firmware from the gateway 20, the electronic control apparatus executes the received substitute firmware (step S504). The electronic control apparatus 32R executing the substitute firmware starts to control equipment controlled by the electronic control apparatus 32B. In addition, when the control system 1 checks that the electronic control apparatus 32R is started using the substitute firmware, the restoration operation is terminated.

FIG. 17 illustrates a relationship between the control system 1 and a car 50 after the restoration operation described with reference to FIG. 16 is executed. In this example, an air conditioning 52 controlled by the electronic control apparatus 32B is controlled by the electronic control apparatus 32R. That is, the electronic control apparatus 32R is operated as an air conditioning control ECU.

[5-3] Effects of Fifth Embodiment

As described above, in the control system 1 according to the fifth embodiment, the backup electronic control apparatus 32R is configured to be operable in the same manner as the other electronic control apparatuses 32 in accordance with firmware to be executed. In addition, the control system 1 according to the fifth embodiment causes an equipment controlled by the electronic control apparatus 32 for control having an abnormality occurring therein to be controlled using the backup electronic control apparatus 32R.

As a result, the control system 1 according to the fifth embodiment, also when an abnormality occurs in the electronic control apparatus 32, it is possible to operate equipment allocated to the electronic control apparatus 32 by the backup electronic control apparatus 32. As a result, the control system 1 according to the fifth embodiment can prevent equipment corresponding to the electronic control apparatus 32 having an abnormality occurring therein from being uncontrollable and to improve safety of the control system 1.

[6] Modification Example and the Like

A memory system according to an embodiment (for example, reference numeral 10 in FIG. 2) includes a first storage region, a second storage region, and a controller. The first storage region (for example, reference numeral 18 in FIG. 2) stores first firmware (for example, normal FW in FIG. 2) corresponding to an external electronic control apparatus. The second storage region (for example, reference numeral 19 in FIG. 2) stores second firmware (for example, special FW in FIG. 2) corresponding to an external gateway and third firmware (for example, diagnosis FW in FIG. 2) corresponding to an electronic control apparatus. When a gateway is started using the first software, the gateway is set to be accessible to the first storage region and inaccessible to the second storage region. When the gateway is started using the second software, the gateway is set to be accessible to the first storage region and the second storage region. The controller transmits the second firmware and the third firmware to the gateway on the basis of a first command received from the gateway. The controller transmits the second firmware and the third firmware to the gateway and then transmits the first firmware to the gateway on the basis of a second command received from the gateway. Thereby, the memory system 10 in the first embodiment can improve safety.

In the above-described embodiments, a case where each of the gateway 20 and the electronic control apparatuses 31 and 32 executes various operations in a restoration operation by executing firmware is described, but the present disclosure is not limited thereto. For example, the gateway 20 and the electronic control apparatuses 31 and 32 may be operated in accordance with a field-programmable grid array (FPGA) image. In this case, each of the normal region 18 and the Shadow-MBR region of the memory system 10 stores the FPGA image. Further, in the restoration operation, an FPGA image corresponding to each firmware is appropriately distributed to the gateway 20 from the memory system 10.

In the above-described embodiments, a case where the memory system 10 is an SSD is described, but the memory system 10 may be any of other storage apparatuses. In a case of the memory system 10 including a normal storage region and a storage region equivalent to or similar to a Shadow-MBR region, it is possible to execute the operations described in the above-described embodiments.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing f rom the spirit of the present disclosure. The different embodiments or features described herein, or portions thereof, may be combined. The accompanying claims and their equivalents are intended to cover such forms or modifications as would fall within the scope and spirit of the present disclosure.

What is claimed is:

1. A memory system comprising:
    a first storage region configured to store a first firmware which is selected in a normal operation;
    a second storage region configured to store a second firmware which is used in a restoration mode and a third firmware which is used in a diagnosis operation, wherein
    the first storage region is configured to be accessible to the gateway when a gateway is started using a first software, and accessible to the gateway when the gateway is started using a second software,
    the second storage region is configured to be inaccessible to the gateway when the gateway is started using the first software, and accessible to the gateway when the gateway is started using the second software; and
    a controller configured to transmit the second firmware and the third firmware to the gateway when the gateway is in the restoration mode, and transmit the first firmware to the gateway when the gateway is in the normal operation.

2. A control system comprising:
    the memory system according to claim 1;
    the gateway; and
    a first electronic control apparatus, wherein
    the gateway is connected to the memory system,
    the first electronic control apparatus is connected to the gateway, and
    the gateway is configured to:
        receive the second firmware and the third firmware from the memory system;
        execute the second firmware and transmit the third firmware to the first electronic control apparatus;
        receive first information from the first electronic control apparatus;
        transmit a second command based on the first information to the memory system;
        receive the first firmware from the memory system; and
        transmit the first firmware to the first electronic control apparatus.

3. The control system according to claim 2, wherein the first electronic control apparatus is configured to:
    execute the third firmware to execute a self-diagnosis operation of examining a state of the first electronic control apparatus;
    transmit a result of the self-diagnosis operation to the gateway as the first information; and
    execute the first firmware.

4. The control system according to claim 2, wherein the gateway is configured to:

check whether the first electronic control apparatus is altered;
transmit a request to the memory system to start the gateway using the second software responsive to determining that the first electronic control apparatus is altered; and
transmit a first command to the memory system after the gateway is started using the second software.

5. The control system according to claim 2, further comprising:
a watchdog; wherein
the watchdog is configured to instruct the gateway to check whether the first electronic control apparatus is altered;
the gateway is configured to transmit second information corresponding to the instruction to the watchdog;
the watchdog is further configured to transmit a request to the memory system to start the gateway using the second software on the basis of the received second information or based on the second information not being received in a predetermined period from the instruction; and
the gateway is further configured to transmit a first command to the memory system after the gateway is started using the second software.

6. The control system according to claim 5, further comprising:
a second electronic control apparatus which is connected to the gateway, wherein
the gateway is configured to check whether the second electronic control apparatus is altered after the first electronic control apparatus executes the first firmware.

7. A control system comprising:
the memory system according to claim 1;
the gateway;
a first electronic control apparatus; and
a second electronic control apparatus; wherein
the gateway is connected to the memory system;
the first electronic control apparatus is connected to the gateway;
the second electronic control apparatus is connected to the gateway; and
the gateway is configured to:
receive the second firmware and the third firmware from the memory system;
execute the second firmware and transmit the third firmware to the first electronic control apparatus;
receive first information from the first electronic control apparatus;
transmit the second command based on the first information to the memory system;
receive the first firmware from the memory system; and
transmit the first firmware to the second electronic control apparatus.

8. The control system according to claim 7, wherein
the first electronic control apparatus is configured to control an external first equipment and the second electronic control apparatus is configured to control an external second equipment;
the first electronic control apparatus is configured to execute the third firmware to execute a self-diagnosis operation of examining a state of the first electronic control apparatus, and transmit a result of the self-diagnosis operation to the gateway as the first information; and
the second electronic control apparatus is configured to execute the first firmware responsive to receiving the first firmware from the gateway and control both the first equipment and the second equipment.

9. The control system according to claim 7, wherein
the first electronic control apparatus is configured to control an external first equipment;
the first electronic control apparatus is configured to execute the third firmware to execute a self-diagnosis operation of examining a state of the first electronic control apparatus, and to transmit a result of the self-diagnosis operation to the gateway as the first information; and
the second electronic control apparatus is configured to execute the first firmware and control the first equipment.

10. A method for managing firmware using a control system that comprises a gateway, a first electronic control apparatus, and a memory system including a first storage region configured to store a first firmware which is selected in a normal operation and a second storage region configured to store a second firmware which is used in a restoration mode and a third firmware which is used in a diagnosis operation, the method comprising:
transmitting, by the controller to the gateway, the second firmware and the third firmware when the gateway is in the restoration mode; and
transmitting, by the controller to the gateway, the first firmware when the gateway is in the normal operation,
wherein the first storage region is configured to be accessible to the gateway when the gateway is started using a first software, and accessible to the gateway when the gateway is started using a second software, and
the second storage region is configured to be inaccessible to the gateway when the gateway is started using the first software, and accessible to the gateway when the gateway is started using the second software.

11. The method according to claim 10, wherein the gateway is connected to the memory system and first electronic control apparatus is connected to the gateway, the method further comprising:
receiving, by the gateway, the second firmware and the third firmware from the memory system;
executing, by the gateway, the second firmware and transmitting the third firmware to the first electronic control apparatus;
receiving, by the gateway, first information from the first electronic control apparatus;
transmitting, by the gateway, a second command based on the first information to the memory system;
receiving, by the gateway, the first firmware from the memory system; and
transmitting, by the gateway, the first firmware to the first electronic control apparatus.

12. The method according to claim 11, further comprising:
executing, by the first electronic control apparatus, the third firmware to execute a self-diagnosis operation of examining a state of the first electronic control apparatus;
transmitting, by the first electronic control apparatus, a result of the self-diagnosis operation to the gateway as the first information; and
executing, by the first electronic control apparatus, the first firmware.

13. The method according to claim 11, further comprising:
checking, by the gateway, whether the first electronic control apparatus is altered;

transmitting, by the gateway, a request to the memory system to start the gateway using the second software responsive to determining that the first electronic control apparatus is altered; and transmitting, by the gateway, a first command to the memory system after the gateway is started using the second software.

14. The method according to claim 11, wherein the control system further comprises a watchdog, the method further comprising:

instructing, by the watchdog, the gateway to check whether the first electronic control apparatus is altered;

transmitting, by the gateway, second information corresponding to the instruction to the watchdog; and transmitting, by the watchdog, a request to the memory system to start the gateway using the second software on the basis of the received second information or based on the second information not being received in a predetermined period from the instruction; and transmitting, by the gateway, a first command to the memory system after the gateway is started using the second software.

15. The method according to claim 14, wherein the control system further comprises a second electronic control apparatus which is connected to the gateway, the method further comprising:

checking, by the gateway, whether the second electronic control apparatus is altered after the first electronic control apparatus executes the first firmware.

16. The method according to claim 10 wherein the control system further comprises a second electronic control apparatus connected to the gateway, the first electronic control apparatus is connected to the gateway, and the gateway is connected to the memory system, the method further comprising:

receiving, by the gateway, the second firmware and the third firmware from the memory system;

executing, by the gateway, the second firmware and transmitting the third firmware to the first electronic control apparatus;

receiving, by the gateway, first information from the first electronic control apparatus;

transmitting, by the gateway, a second command based on the first information to the memory system;

receiving, by the gateway, the first firmware from the memory system; and transmitting, by the gateway, the first firmware to the second electronic control apparatus.

17. The method according to claim 16, further comprising:

controlling, by the first electronic control apparatus, an external first equipment;

control, by the second electronic control apparatus, an external second equipment;

executing, by the first electronic control apparatus, the third firmware to execute a self-diagnosis operation of examining a state of the first electronic control apparatus, and transmitting a result of the self-diagnosis operation to the gateway as the first information; and executing, by the second electronic control apparatus, the first firmware responsive to receiving the first firmware from the gateway and controlling both the first equipment and the second equipment.

18. The method according to claim 16, further comprising controlling, by the first electronic control apparatus, an external first equipment;

executing, by the first electronic control apparatus, the third firmware to execute a self-diagnosis operation of examining a state of the first electronic control apparatus, and transmitting a result of the self-diagnosis operation to the gateway as the first information; and executing, by the second electronic control apparatus, the first firmware and control the first equipment.

19. A control system comprising:

a gateway;

a first electronic control apparatus configured to control an external apparatus;

a second backup electronic control apparatus; and a memory system comprising:

a first storage region configured to store a first firmware which is selected in a normal operation;

a second storage region configured to store a second firmware which is used in a restoration mode and a third firmware which is used in a diagnosis operation; and a controller configured to transmit the second firmware and the third firmware to the gateway when the gateway is in the restoration mode, and transmit the first firmware to the gateway when the gateway is in the normal operation, wherein the gateway is configured to receive the first firmware from the memory system, and to transmit the first firmware to the second backup electronic control apparatus, and the second backup electronic control apparatus is configured to execute the first firmware to control the external apparatus.

20. The control system of claim 19, wherein:

the third firmware is self-diagnosis firmware;

the first electronic control apparatus is configured to:

execute the third firmware to execute a self-diagnosis operation of examining a state of the first electronic control apparatus; and transmit a result of the self-diagnosis operation to the gateway; and the gateway is configured to transmit a second command to the memory system on the basis of the result of the self-diagnosis operation.

* * * * *